② United States Patent
Gerke et al.

[15] 3,668,319
[45] June 6, 1972

[54] CENTRAL COMMAND GENERATOR FOR TIME DEPENDENT PROGRAM CONTROLLED FUNCTIONAL SEQUENCES IN TELECOMMUNICATION EXCHANGE INSTALLATIONS

[72] Inventors: Peter Gerke, Grafelfing; Hans Baur, Munich; Karl Rutkowski, Pullach; Hans-Eugen Binder, Gauting; Helmut Palsa, Oberbachern; Hartmut Fabianke, Dusseldorf-N, all of Germany

[73] Assignee: Siemens Aktiengesellschaft, Berlin and Munich, Germany

[22] Filed: May 21, 1969

[21] Appl. No.: 826,432

[30] Foreign Application Priority Data

May 24, 1968 Austria ..............................A 5014/68

[52] U.S. Cl. ........................................................179/18 ES
[51] Int. Cl. ........................................................H04m 15/00
[58] Field of Search .................179/18 ES, 18 EB, 2 TC, 7.1; 340/172.5

[56] References Cited

UNITED STATES PATENTS

| | | | |
|---|---|---|---|
| 3,348,211 | 10/1967 | Ghiron | 340/172.5 |
| 3,480,917 | 11/1969 | Day | 340/172.5 |
| 3,510,591 | 5/1970 | Klein | 179/2 TC |
| 3,517,123 | 6/1970 | Harr et al. | 179/18 ES |

*Primary Examiner*—Kathleen H. Claffy
*Assistant Examiner*—David L. Stewart
*Attorney*—Birch, Swindler, McKie & Beckett

[57] ABSTRACT

A central command generator for control commands of time-dependent program controlled functional sequences in exchange installations, the command generator having a pulse generator and at least one counting register with individual stages. At least one separate storage segment is assigned to each individual stage. Means are provided to register the identification addresses of the control commands after the expiration of a predetermined time interval or for the counting off of predetermined time intervals, in the corresponding storage segment assigned to that stage of the counting register which follows the stage identified by the counting register, by a number of stages equal to the quotient of the associated time interval and the basic period of the counting register.

8 Claims, 18 Drawing Figures

| Int. | An-AD | L-AD |
|---|---|---|
| 1 | 10 | 0 |
| 2 | 20 | 20 |
| 3 | 30 | 33 |
| 4 | 40 | 0 |
| 5 | 50 | 50 |
| 6 | 60 | 61 |
| 7 | 70 | 72 |
| n-1 | 10·(n-1) | 0 |
| n | 10·(n) | 0 |

| A | B | F |
|---|---|---|
| 0 | 0 | 0 |
| 0 | 1 | 0 |
| 1 | 0 | 0 |
| 1 | 1 | 1 |

| A | B | F |
|---|---|---|
| 0 | 0 | 0 |
| 0 | 1 | 1 |
| 1 | 0 | 1 |
| 1 | 1 | 1 |

| A | B | F |
|---|---|---|
| 0 | 0 | 0 |
| 0 | 1 | 0 |
| 1 | 0 | 1 |
| 1 | 1 | 0 |

| state | a | b |
|---|---|---|
| set condition | 1 | 0 |
| reset condition | 0 | 1 |

CENTRAL COMMAND GENERATOR FOR TIME DEPENDENT PROGRAM CONTROLLED FUNCTIONAL SEQUENCES IN TELECOMMUNICATION EXCHANGE INSTALLATIONS

CROSS REFERENCE TO RELATED APPLICATION

Applicants claim priority from corresponding Austrian application Ser. No. A 5014/68, filed May 24, 1968.

BACKGROUND OF THE INVENTION

1. Field of the Invention

The invention relates to a central command generator for time dependent program controlled functional sequences and has particular utility in exchange installations such as in telephone systems.

2. Description of the Prior Art

In exchange installations such as telephone exchange installations, it is often necessary that control processes being carried out are dependent upon the expiration of particular time intervals. To measure these time intervals, timing elements in the form of capacitors or counters controlled by a central pulse generator are individually assigned to the switching devices carrying out the control programs or process.

It is known to combine the individual time elements at a central location. They may then be requested, as needed, by the decentralized switching devices and, after the expiration of the given time interval, cause the decentralized switching device to initiate the corresponding control process to be carried out.

The principle of centrally arranging the timing elements is especially applicable to modern exchange installations having stored program central control means, e.g., computers, that control and supervise the entire functional procedure within an exchange installation from a central location. For timely initiation of individual control programs of the central control means and monitoring of time-dependent functional sequences within the exchange installation, the central control means of such modern exchange installations are equipped with central command generators that provide the control pulses for the initiation of the individual programs and the time-dependent switching functions.

The principal element of such a central command generator is a pulse generator in the form of a time table developed from individual storage elements—for example, magnetic cores—which are subdivided into rows and columns similarly to a matrix. The individual rows of the time table are driven in cyclic succession and periodically recurring manner, dependent on a basic pulse rate, while the individual columns of the time table are in each case assigned to a program. The individual storage elements within each program column thereby indicate in each case whether or not the relevant program is to be initiated when the associated row is driven. Dependent on the number of markings per program column there result, through the periodic reading of the time table, control pulse trains for initiation of the individual control programs with varying pulse frequency. These, dependent on the selection of the programs, either control the sequence of exchange switching processes, or are available as basic pulse rate for additional time tables or other time elements in the form of counters that are used in the measurement of more extended time intervals for time dependent program controlled functional sequences which cannot easily be fitted into the rigid timing pattern of the principal time table.

To generate control commands for such timed program controlled functional programs or sequences, a separate storage segment is fixedly assigned to each of the time cadences generated by the time table, to which further storage segments can be assigned in a process of free selection through the medium of combination addresses. These further storage segments also have, in addition to the storage places for the combination addresses, an address storage position for the identification of that switching device which is to be driven after the expiration of the prescribed time interval or of a storage segment assigned to this switching device, as well as a counter segment which designates the given time interval in multiples of the controlling time rate. Thus as many storage segments with counting segments or so-called counting registers, are to be provided as there are switching devices to be supervised and controlled simultaneously.

SUMMARY OF THE INVENTION

The present invention also concerns a central command generator for timed sequences controlled functional sequences in exchange installations such as telephone exchange installations having a pulse generator and at least one counting register. It is an object of the invention to further decrease expenditures compared to the prior art relating to the generation of control pulses for the release of time dependent functional programs. This is achieved through the fact that to each individual stage of the counting register a separate storage segment is assigned, and that the code addresses of the control commands for the initiation of switching or control functions, arriving at arbitrary times, are registered only after the expiration of a given time interval or for the measuring off of given time intervals, in each case, in a storage segment. The latter is assigned to that stage of the counting register which follows the stage identified by the counting register by a number of stages corresponding to the quotient of given time period and basic period of the counting register.

Thus, according to the invention, only a single counting register is required per time cadence, and this is advanced cyclicly and in periodically recurring manner, dependent upon the controlling time cadence. In order to guaranty with relation to the counting register cycle, that the time dependent control commands arriving at different points in time can also be timely processed, a separate storage segment is fixedly assigned to each time interval stage which serves, analogous to the address segments of the individual counting registers in the known arrangement, for the reception of the code address of the connecting section to be controlled, or of the storage segment assigned to this switching device.

Due to the classification of the control address applied in each case to a storage segment of the counting register, which is driven after the desired time interval within the normal counting register cycle, it is further assured that the time period to be bridged is accurately kept. There results a very simple operational program of the command generator as each occurrence of driving of a time interval stage of the counting register is equivalent to the time sequence of the control commands identified in this time interval stage. In this regard, it does not matter how many simultaneously arriving control commands are to be carried out within a time interval stage, as to each storage segment of the individual counting register stages any number of further storage segments can be assigned when checking over connecting addresses, without the need for an individual counting segment therefor in each case which would be equivalent to an individual counting register. Thereby the spectrum of the possible time intervals is dependent on the number of stages of the counting register, just as in the known arrangement; the same is true for the accuracy of the time periods to be generated.

However, the spectrum of the time periods which can be generated, and the accuracy thereof can be considerably increased according to a further development of the invention if (1) several counting registers are combined into a succession circuit, wherein each subsequent counting register is switched forward with the cyclic rate of the preceding counting register in each case; (2) the storage segments assigned to the individual stages of the individual counting registers have, in addition to the subsidiary segment for the code addresses of the individual control commands, further subsidiary segments the number whereof corresponds to the total count of the preceding counting register in each case; (3) for the measuring of a given time duration, the phase time of the command transmitter, determined by the setting of all counting registers, is added thereto, and the thus obtained time value is divided into whole-number multiples of the individual counting register synchronizations proceeding from the largest basic cadence; (4) the code address of the relevant control command is registered at first in a storage segment of the counting register identified by the largest necessary basic cadence, which storage segment is assigned to that stage of the counting register which is identified by the multiple of the relevant basic cadence and; (5) in the free subsidiary segments of the so determined storage segment, the multiples of the remaining basic synchronizations are also registered as addresses for the stages of the thereto pertaining counting registers, successively taking over the identification address of the control command together with the remaining multiples in each case.

Through the sequential arranging of several counting registers there results at first a considerably lower cost than if, instead, a single counting register of appropriate size were provided. Even though, due to the continuous transmission of a code address from one counting register into the other, the control requirements are increased in the mean, this is of no great importance compared to the savings in registration stages. By considering the phase time of the command generator at the time of first storage of a code address, the end of the time period is synchronized with the stepping rates of the individual counting registers. Therefore, at considerably lower costs than in the known arrangement, time periods with very narrow tolerance limits can be realized.

Also, according to a further development of the invention, the control processes within the command transmitter can be considerably simplified if, to trigger processes occurring often, time dependent functional programs such as, for example: driving digits by integration of impulse trains; follow-on transmission of digits; gating of dialing pause times and zone metering; providing separate counting registers are provided, the number of stages whereof in each case equals the quotient of the time period provided therein; and selecting the most favorable basic cadence time or periodicity in each case. The identification addresses of newly arriving control commands can in each case then be registered in the just driven interval stage of the counting register, as the cycle time of the counting register exactly corresponds to the desired time interval. This results in considerable simplifications in the combination of several commands to be processed simultaneously.

Moreover, the last mentioned development of the invention provides, in simple manner, the possibility of adapting a single counting register to different time conditions, as they are to be fulfilled, for example, within the framework of the charge determination at the reversal from day to night tariff and vice versa. This results because a control device is assigned to the counting register by which the number of stages of the counting register cycle is changeable, and in that with the shortening of the counting register cycle (for example, due to commutation of the counting from night to day tariff) the storage segments assigned to the no longer required stages of the counting register, are assigned, stage by stage, to the storage segments of the remaining stages.

There also exists the possibility according to another development of the invention, that the storage segments for the code addresses, assigned to the no longer required stages of the counting register, are assigned, stage by stage, to the storage segments of the remaining stages.

There also exists the possibility according to another development of the invention, that the storage segments for the code addresses, assigned to the individual stages of a counting register, or the thereby identified storage segments, in each case possess a subsidiary segment, utilized as a counting means, so that times corresponding to the multiple of the counting register cycle can be supervised.

Yet another further development of the invention resides in the fact that the storage segments for the code addresses, assigned to the individual stages of a counting register, or the storage segments identified thereby have in each case a subsidiary segment used for special signals, so that a single storage segment can be utilized several times for different control functions; for example, subsequent transmission of digits and gating of dialing pause times.

BRIEF DESCRIPTION OF THE DRAWINGS

FIG. 1 shows the development of the central control means of a modern telephone exchange installation with a stored program functional program. The central control means includes control mechanism E/A for the input and output of data, data store SP, command generator BF and central program control part Prog-St which interconnects the units. Data exchange between the central control part and the peripheral parts of the installation of the exchange installation (primarily the individual connection lines, and sets, the coupling network for the switching through of connections, and the control systems) is provided over control mechanism E/A. Data part SP contains stored individual control programs as well as all data important for the individual exchange processes. The command generator BF supplies program control Prog-St with the different control cadences in order to guaranty the timely progression of the individual functional programs and the individual exchange processes.

FIG. 2 shows in detail a part of the command generator BF contained in FIG. 1 and that part of central program control Prog-St of interest in this connection. The principal portion of the shown command generator BF is counting register Z1 which can be cyclicly advanced through the basic synchronization T, in conjunction with storage units SP1 and SP2.

Figures 1, 3:
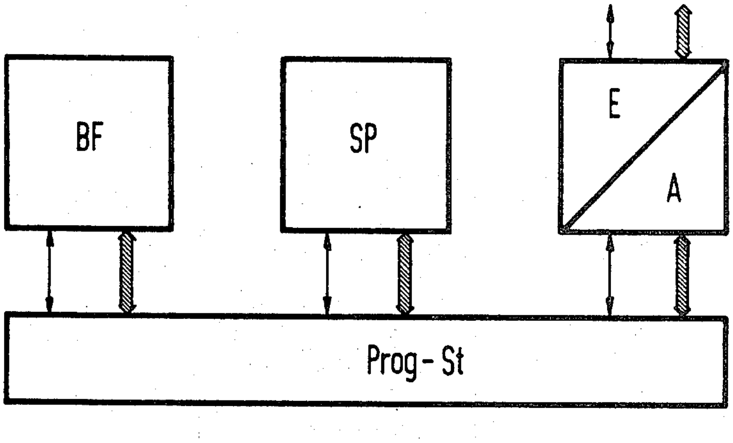
FIG. 1 is a block circuit diagram of the central control means of a program-controlled exchange installation.
FIG. 3 shows the storage segments coupled with the counting register to explain the general principle of the invention.
Figure 2A:
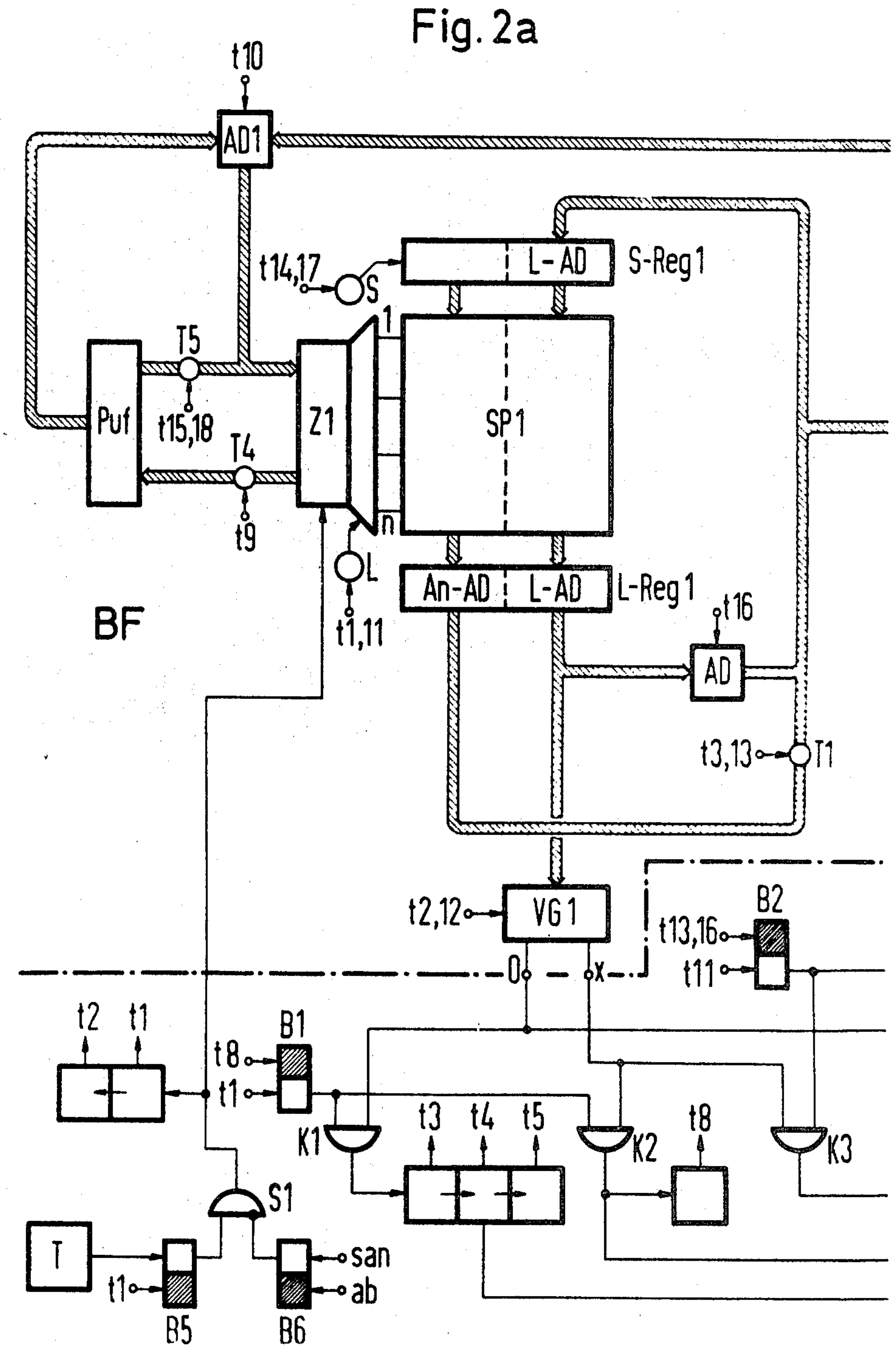
FIGS. 2*a* and 2*b* show a working example according to the general principle of the invention illustrating a command generator and program control.
Figure 2B:
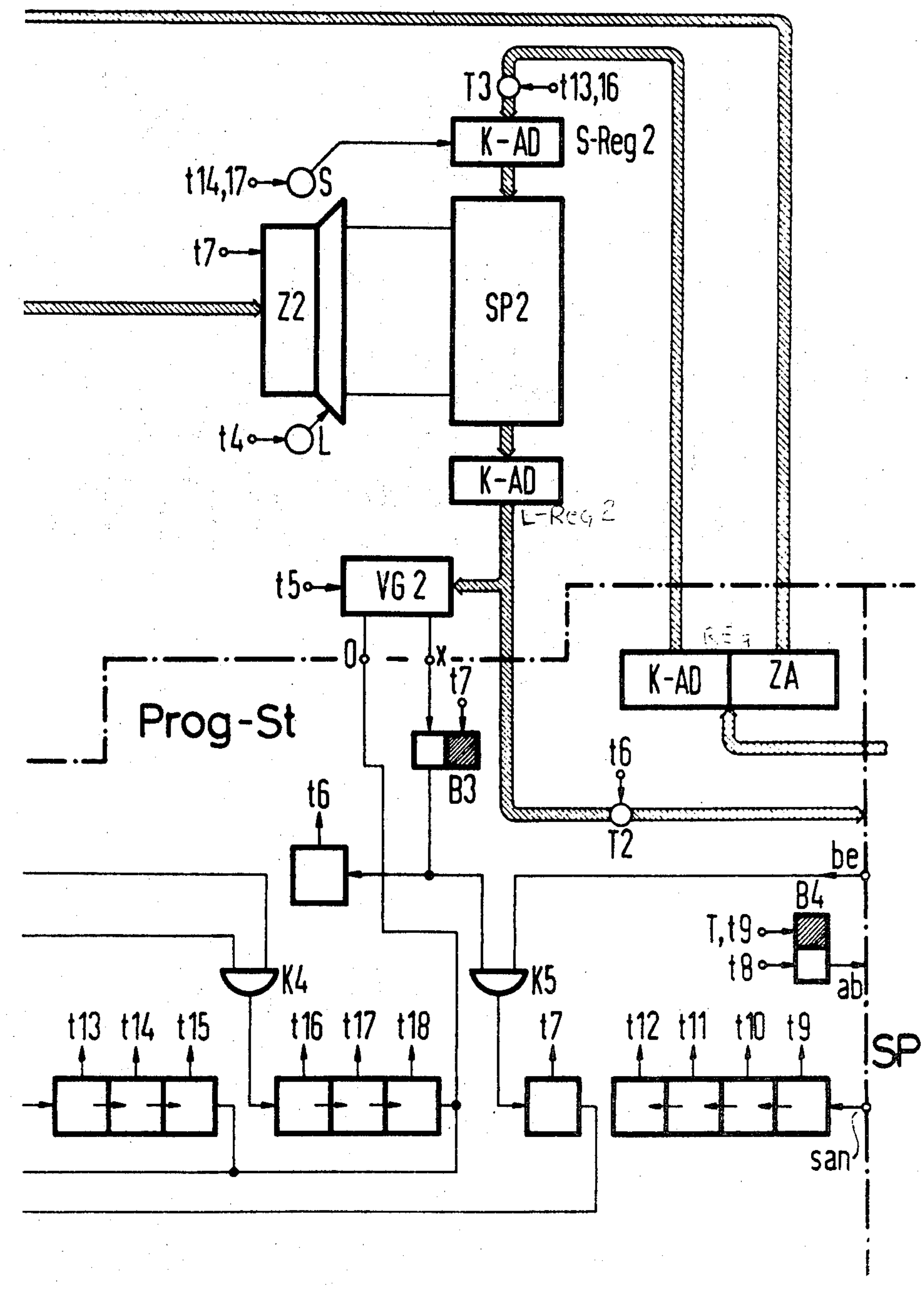

In order to facilitate an understanding of the structural description given herein in conjunction with FIG. 2, the principles of operation will be briefly explained with the aid of FIG. 3.

The counting register Z1 contains *n* counting stages, and counter Z1 is driven to switch to succeeding stages by pulse generator T. Thus, the counting rate of counter Z1 is determined by the pulse rate of the generator T. To each counting stage *n*, a storage segment in storage SP1 is permanently assigned. Each such segment in SP1 could receive and store the address K-AD of a command to be carried out, if it is ascertained that in the interval between two pulses from generator T only a single timing request will occur. Obviously, in a complex system, a number of such requests will arrive at random intervals, and it is likely that two or more will arrive in a single interval between successive pulses from generator T. Thus, the storage segments in SP1 cannot simply be repositories of command addresses. These storage segments, however, can be used to provide access to particular segments of a second storage SP2 in which the addresses K-AD for the commands to be executed are stored.

Therefore, in storage SP2, an area, containing a number of segments, is permanently assigned to each counting stage *n*. In order to reach a beginning segment of a given area in SP2, an address for this purpose An-AD is placed in the corresponding area in storage SP1. This same corresponding area in SP1 contains, in a different segment, an address for access to a particular segment in SP2 in the same corresponding area for the particular counting stage in question, in which the last arriving timing request for this timing stage has been stored. The reception and storage of this last address by the particular segment of storage SP1 considerably simplifies the operating sequence of the command generator.

Referring to FIG. 3, it will now be assumed that counting register Z1 is set on its second counting stage. The address 20 for the beginning segment of the corresponding storage area SP2 is stored in the pertinent portion of SP1. At this stage, it can be seen from the figure that the beginning and last addresses are alike, so only a single control command is present for this timing interval.

In order to more fully understand how the various storage segments are accessed, it will be assumed that a control command which has a timing request for three intervals is received for processing by the command generator BF. Remembering that the counter Z1 is currently positioned at stage 2, this control command must be inserted in stage 5, i.e., three intervals corresponding to the timing request. In reading out the contents of the area in SP1, corresponding to counting stage 5, it is found that the address of the beginning segment in SP2 for stage 5, is 50. However, because address L-AD, stored in the same area of SP1 is 0, it is determined that no control command has, as yet, been stored in the storage area of SP2 corresponding to counting stage 5. Thus, the assumed control command is placed in this storage area, and the last address for this storage area in SP1 is changed accordingly, i.e., to 50. This done, counting register Z1 is returned to stage 2, and allowed to continue to cycle through the successive stages.

Counting register Z1 will now advance through the successive stages at a rate determined by pulse generator T. Counting stage 5 will be reached after three intervals or three periods of a counting stage have expired. Upon reaching counting stage 5, the beginning address in storage SP1 for the storage area in SP2 relevant to stage 5, will allow access to that area of SP2. The control commands inserted in this portion portion of SP2 for timing stage 5 are read in succession and transmitted for processing. Each control command inserted into this particular cycle of the counting register is, thus, available for processing at the appropriate time. By using this means, the width of the time intervals which are measured in this way, and the tolerance limits thereof, are thereby determined solely by the number of counting stages of the counting register and the length of the individual time intervals, which is determined by the pulse rate which advances the counting register from stage to stage.

Proceeding from the above described basic principle, the mode of operation of the arrangement according to FIG. 2 is as follows:

With each control pulse of basic pulse rate T, bistable flip flop stage B5 is at first set. The control pulse then can be applied over blocking AND gate S1 to switch counting register Z1 forward and can also start synchronizing stage *t*1, if bistable flip flop stage B6 is in rest position. Flip flop B6 is switched in each case into the operating state only if the request for registration of this new control command is communicated, over control line designated *san*, from the data and command storage. It is reset again at the end of the writing process, over control line *ab*, to await receipt of a new control command with the marking of readiness to receive. In this manner it is assured that a registration process just running at the arrival of a control pulse of basic pulse rate T can be completed without interruption.

As soon as synchronization stage *t*1 is started, the row approached by counting register Z1 in storage unit SP1 is read over position system L, and the information thereof is transmitted into reading register L-Reg1. With the subsequent synchronization stage *t*2 becoming effective, the last-address L-AD contained in the driven storage segment, is checked by means of comparator VG1.

If the checked last-address equals 0 and since no control command to be carried out exists for this time interval, then with the control signal appearing at signal output 0 of comparator VG1, synchronization stage *t*8 is immediately rendered effective over coincidence gate K2 which has already been released with the bistable flip flop stage B1 set by synchronization stage *t*1. That synchronization stage *t*8 becomes effective is a sign that no further control commands can be taken over from data storage SP of the central control means and registered into storage SP2.

If, however, a control signal appears at signal output *x* of comparator VG1, then synchronization stage chain *t*3 to *t*5 is started over coincidence gate K1. Thus there exist control commands to be carried out for the driving time interval, which must now be transferred out of storage SP2. For this purpose, first selection register Z2 for storage SP2 is set with synchronization *t*3 over switch T1 with the beginning address An-AD read out of storage SP1. The driven storage segment of storage SP2 is read with synchronization t4, and its information contents transmitted into reading register L-Reg2. Subsequently, with synchronization *t*5 comparator VG2 examines whether an code address K-AD is contained in the read storage segment. Dependent on the result of this examination, either synchronization stage *t*8 is made effective over signal output 0 of comparator VG2, and thereby, as already mentioned, one proceeds with the registration of newly present commands, or at the presence of a command, flip flop stage B3 is set over signal output *x* and thereby synchronization stage *t*6 is actuated. Then the code address K-AD of the command to be processed is forwarded for further processing with operating pulse t6 over switch T2.

As soon as over control line *be* the return announcement is available that the control command transmitted over switch T2 has been carried out, synchronization stage *t*7 is immediately activated over coincidence gate K5 which has been released in the meantime by flip flop stage B3. Thereby first the counter setting of selection register Z, also developed as cyclicly operating chain circuit, is increased by one unit and so the next following storage segment of the thereto pertaining segment area in storage SP2 is approached driven, and subsequently, with the actuation of synchronization stage *t*4, the reading and transmission cycle for storage SP2 again initiated. This action now repeats itself until finally synchronization stage 58 is switched effective through output 0 of comparator VG2.

Proceeding from the setting of counting register Z1 by a control pulse of synchronization pulse generator T, all control commands assigned to this time interval and stored in storage SP2 are read and thereby released to be processed. Only after this retransmission process has been completed is command generator BF ready to receive new control commands. Synchronization stage *t*8 initiates this second operational segment by the setting of bistable flip flow stage B4, in that the readiness to write is communicated to data storage SP over control line *ab*.

If a control command to be newly received exists, the chain circuit comprising synchronization stages *t*9 to *t*12 is started over control line san, and at the same time register Reg is charged with identification address K-AD of the new command and the time request ZA thereof. At first synchronization *t*9 resets flip flop stage B4, which could also be done directly through the control pulse on line san. Further, the count of counting register Z1 is intermediately stored in storage Puf over switch T4. Subsequently with pulse t10 is derived by means of adding means AD1 from the old count of counting register Z1 and time request ZA of the new control command, that counting stage to which the new command is to be assigned and counting register Z1 is set thereon. With the subsequent pulse T11, the so selected storage segment is read and with pulse $t12$ it is examined by comparator VG1 as to whether or not a control command is already stored for the selected time interval.

If no control command is present yet, the new control command is to be registered in the storage segment of storage SP2 identified by the read beginning address An-AD. However, if a control command is already present and stored, then, by reason of the found last-address, the next following storage segment is to be determined in storage SP2 by the addition of a 1 and the new control command is to be registered there.

According to these two basic tasks, at the appearance of a control signal at outlet 0 of comparator VG1, the chain circuit comprising synchronization or pulse counting stages $t13$ to $t15$ is started over coincidence gate K3 already triggered by flip flop stage B2, which was set in the meantime. Over switch T1, with the becoming effective of synchronization stage $t13$, selection register Z2 of storage SP2 is set with the read beginning address An-AD from storage SP1, and writing register S-Reg 1 of storage SP1 is charged with the new last-address. Furthermore the code address K-AD of the new control command is transmitted in writing register S-Reg 2 over switch T3. With the subsequent operating pulse $t14$, the informations made available in the writing registers in this manner are registered into the selected storage segments of storages SP1 and SP2. As soon as this writing process is completed, the original count of counting register Z1 is again transmitted back out of storage Puf with the subsequent operating pulse $t15$ over switch T5, and the counting register is set on the originally driven counting stage.

The registration of the new control command is thereby concluded, and as a consequence synchronization stage t8 is again approached and the ready to receive stage is communicated to data storage SP. As soon as a further control command is present, pulse counting stage chain $t9$ to $t12$ is again started over control line san, and thereby the operational succession, fixed by these synchronization stages, carried out again.

If in examining the read last-address L-AD in storage Sp1 it is found by comparator VG1 at the end of this operational succession that control commands are already present and stored for the time interval in question, then the synchronization stage $t16$ to $t18$ is started by the control signal appearing at signal outlet $x$ of comparator VG1 over coincidence gate K4. With the first operating synchronization $t16$ of this new operating succession, the read last-address L-AD is conducted over the 1-adding means AD, and the appropriate storage place of the writing register S-Reg1 as well as the selection register Z are charged with the new address.

At the same time the identification address K-AD of the newly arrived control command is transmitted from input storage Reg into writing register S-Reg2 by opening of switch T8. Thereby all informations necessary for the writing process subsequently released by operating pulse $t17$ are made available. The last pulse t18 of this operating succession again effects, over switch T5, the setting of counting register Z1 on the originally driven storage segment, so that thereby the initial state is again established and the renewed starting of synchronization stage T8 can take place.

For the derivation of the next storage place address for storage SP2 in each case, the correspondingly cyclicly advanced selection register Z2 could also easily be switched forward by one stage with synchronization $t16$, and the new count of the counter transmitted as last-address L-AD into writing register S-Reg1. The 1-addition means AD would then no longer be required.

This action can now be repeated until with the next control pulse of basic synchronization T, bistable flip flop stage B4 is again switched into rest position for the duration of the thereupon following reading process.

Figure 4:
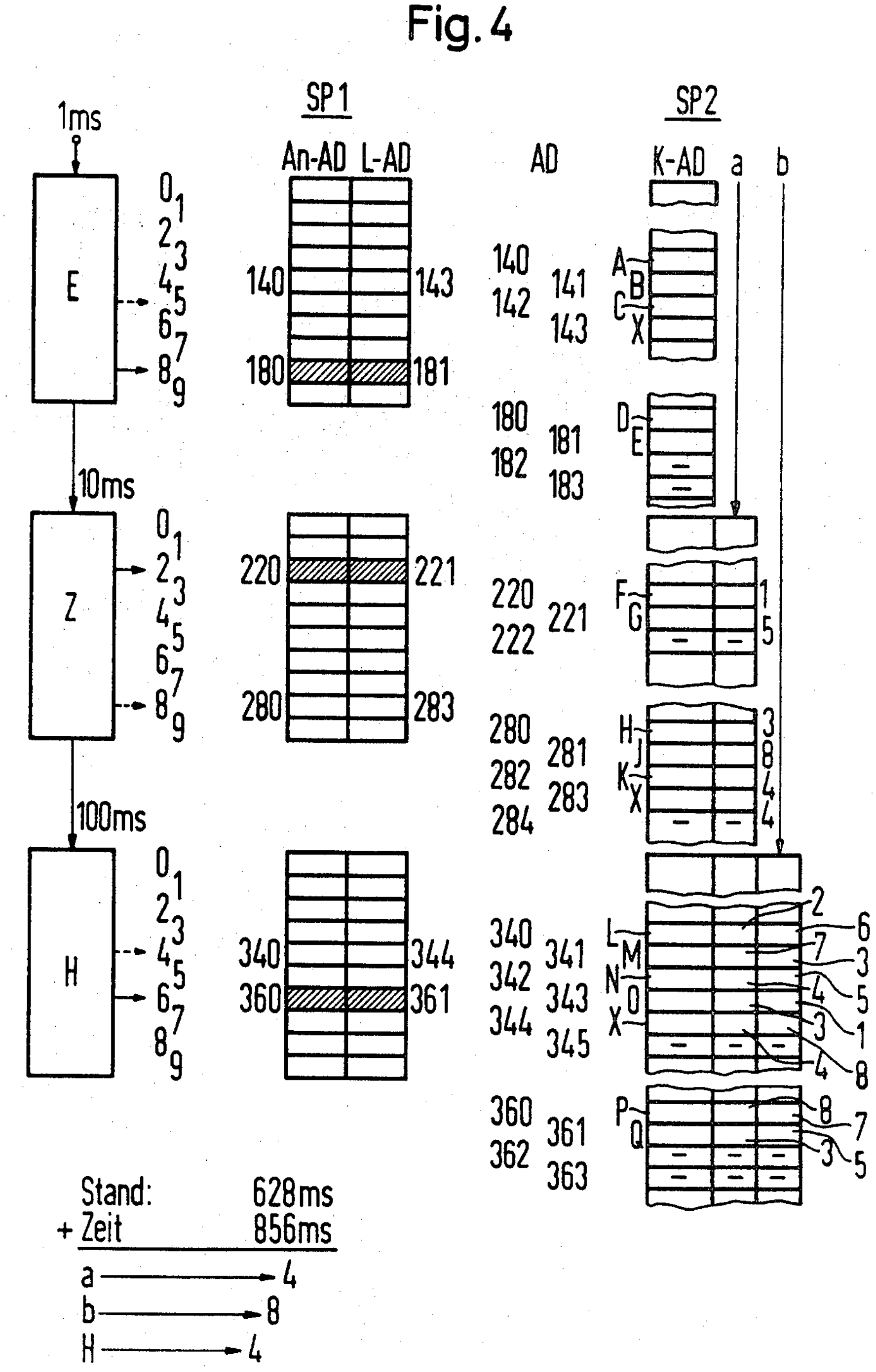
FIG. 4 shows the storage segments coupled with several counting registers forming a succession circuit.

The control principle forming the basis of the arrangement according to FIG. 2 can equally be carried out in the same manner if several counting registers are connected in the form of a succession circuit. FIG. 4 shows in this case the systematic distribution of the individual storage segments onto the individual counting registers. A total of three counting registers E, Z and H are provided, which are connected with each other in the form of a succession circuit. Counting register E is, analogous to counting register Z1 of the arrangement according to FIG. 2, advanced directly by a basic pulse rate, the control pulses whereof follow each other at, for example, intervals of 1 millisecond (ms.). The remaining counting registers Z and H are provided in each case with a control pulse when the preceding counting register has completed a full cycle. If, for example, 10 counting stages are selected for each counting register there results, in the case of the selected basic pulse rate of 1 ms., an advancing pulse rate of 10 ms. for counting register Z and 100 ms. for counting register H. This corresponds to a counting cycle of 10 ms. with counting register E, 100 ms. with counting register Z, and one second with counting register H. Thus with the three shown counting registers, time intervals of up to 1.11 seconds can be realized directly. This time can be enlarged as required by further counting registers. The total expenditure for such a succession circuit remains considerably lower than that for a single linear counting register with comparable time accuracy, as, compared to the working example according to FIG. 4, this would have to have a minimum of 1,000 counting stages.

Analogous to the arrangement according to FIG. 2, to each counting stage of the individual counting registers there is again fixedly assigned a storage segment in storage SP1, which in each case is divided into a first subsidiary segment for the beginning address An-AD of the related segment area in storage SP2, and a second subsidiary segment for the last-address L-AD for identification of the storage segment in each case seized last with the identification address K-AD of a control command, of the segment area in storage SP2, fixed by beginning address An-AD.

For the sake of simplification it shall be assumed that to each storage segment in storage SP1, 10 cyclicly connected storage segments in storage SP2 are assigned, which are approachable in each case in continuous succession.

To counting stage 8 of counting register E, for example, there is assigned in storage SP2 that segment area that begins with beginning address 180. In this segment area only the storage segments 180 and 181 are seized with identification address D or E of control commands to be carried out. In addition to the partial segments and the identification addresses K-AD of the individual control commands, the storage segments assigned to counting registers Z and H have in storage SP2 additional partial segments $a$, or $a$ and $b$, wherein in each case that counting stage is marked into which a control command is to be inserted at the transfer from one counting register to the next following preswitched counting register. The partial segments a thereby designate in each case the counting stages of counting register E, and the partial segments $b$ the counting stages of counting register Z.

The operating principle forming the basis of such an arrangement is as follows. As soon as a control command to be registered is present, the phase time of the command transmitter is determined. The phase time is obtained from the position in each case of the individual counting registers under consideration of the timing pulses switching the individual counting registers forward. In the present case, counting register Z in position 2 and counting register H in position 6, which corresponds to a phase time of 628 ms. To this phase time is first added the duration of the time interval to be supervised, for example 856 ms., and the so obtained sum is divided into multiples of the time interval of the individual counting registers.

An example with regard thereto is given in the lower bottom part of FIG. 4. In the case of the selected values there results the following control succession. First the control command is registered in a free storage segment of storage SP2, which is assigned to counting stage 4 of counting register H. Just as in the arrangement according to FIG. 2, the needed free storage place in storage SP2 is directly derived from the last address L-AD contained in the driven storage place of storage SP1. In the present case this identifies storage place 343 in storage SP2 so that there results therefrom as the next free storage place, storage segment 344. Into this storage segment there is now recorded the code address and into subsidiary areas *a* and *b* the previously determined multiples 4 and 8. Furthermore in storage SP1 the last-address assigned to counting stage 4 of counting register H, is appropriately changed. Thereafter counting register H is again set on the previously held counting stage 6.

As soon as 8 switch-forward pulses have been applied to counting register H, and thereby counting stage 4 has been reached within the normal counting cycle, all storage segments seized in storage SP2 by an equal control command are read, beginning with beginning address 340, and, among others also control command X, last recorded in storage segment 344.

At the same time an examination is made as to whether in subsidiary segments a and b markings are contained. The absence thereof indicates that the time interval of the read control command is already over and therefore a transmission into any preswitched counting register is no longer necessary.

However in the present case subsidiary segments *a*, as well as *b*, contain one marking each, whereby the marking of partial segment *b* signifies that the thereto pertaining control command is to be applied first to counting register Z for insertion into counting stage 8.

Thus again the storage segment is approached, the next following free storage place 283 in storage SP2 is determined with the aid of last-address 282 and command X is registered there, the last-address is appropriately changed in storage SP1, and counting register Z is again switched back into the old position. The same action is repeated when counting register E takes over command X, where it is now inserted into counting stage 4, analogous to the data in partial segment a of storage SP2.

There results for the considered control command X the following delay times in the individual counting registers: 772 ms. in counting register H (either interval step corresponding to 800 ms., minus the phase time of counting registers E and Z of 8 ms. and 20 ms.); 80 ms. in counting register Z; and 4 ms. in counting register E. This totals up to the desired time interval of 856 ms. It must be observed that the delay time in the preswitched counting registers, counting registers E and Z, in each case corresponds to the delay time from the beginning of the cycle in each case to the driving of the counting stage into which the command is inserted, as due to the consideration of the phase time of the command generator in the beginning and due to the succession control of the individual counting registers, a transmission from one counting register to the next following preswitched one occurs at the beginning of the cycle. Thereby a significant advantage of the invention becomes evident, as due to the synchronizing of the taking over of the command in each case with the advancing pulse of the individual counting registers, the deviation from the desired time interval is never greater than the smallest claimed time interval. Thus if counting register E is used, 1 ms.

The principle of the invention for a central command generator explained with the aid of FIG. 4 can also be explained analogously with the aid of FIG. 2 and with reference to FIG. 3. The arrangement of FIG. 2 would only have to be multiplied, depending on the number of counting registers used. Their program controls would then have to be connected in such a way that with the driving of the first counting stage of the lowest-ranking counting register (with reference to FIG. 4, of counting register E) all control commands connected to the first counting stage are transmitted; and, subsequently, all control commands included in the driven counting stage of the next following counting register are examined and all control commands to be transmitted to the preceding counting register are transmitted, in fluctuation with the said lowest-ranking counting register. This is analogous to the taking over of control commands in the arrangement according to FIG. 2.

After rewriting or emission of all control commands, the control commands included in the next-higher counting register are examined in the same manner and, in a given case, transmitted in the other, already checked, counting registers. Only when all control commands included in the counting stages of the individual counting registers of the command generator, approached in each case are checked, is the taking over of control commands, newly arrived in the meantime, from data store SP begun, analogous to the arrangement according to FIG. 2.

Figure 5A:
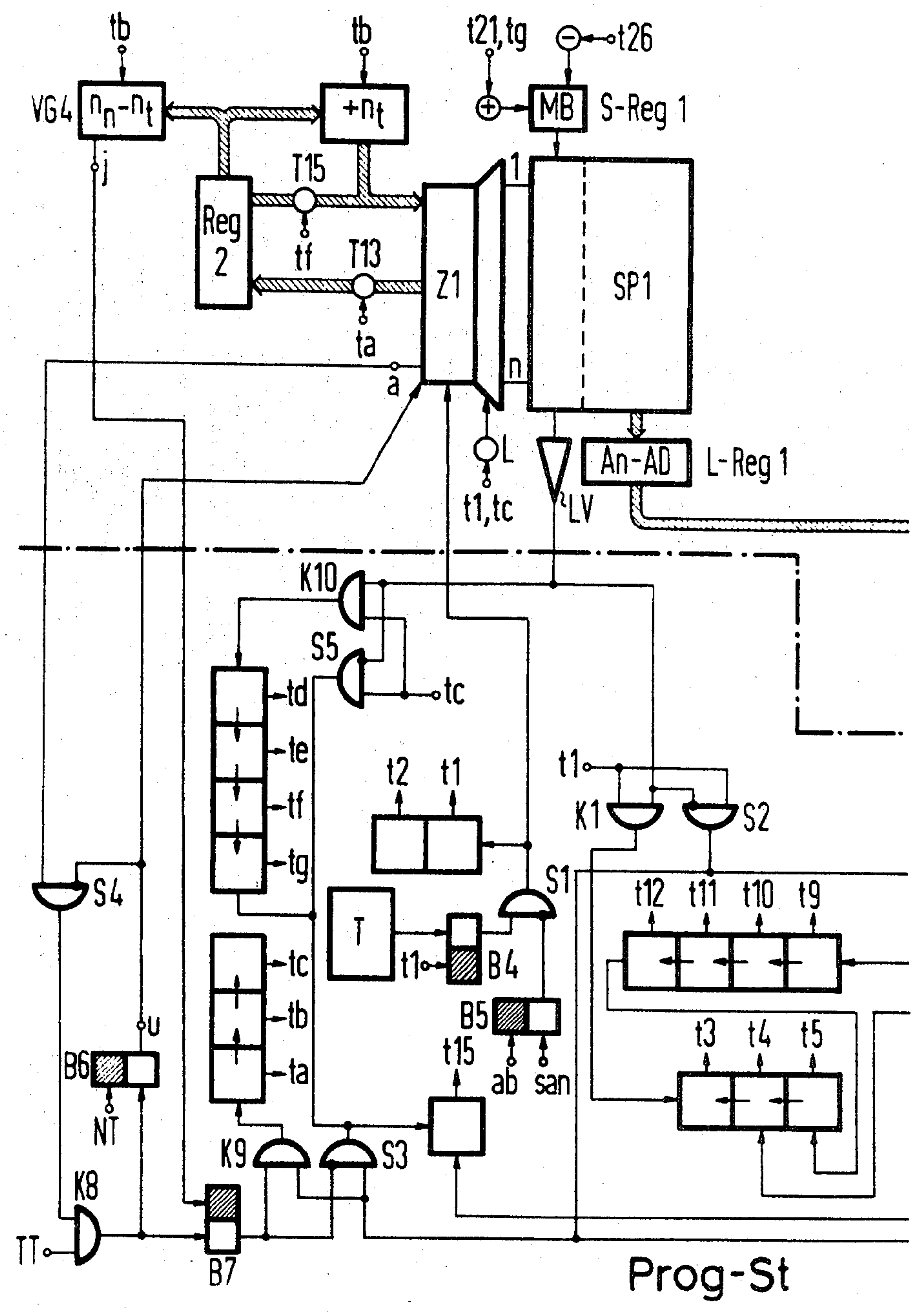
FIGS. 5*a* and 5*b* show a working example for counting registers, the cycle time whereof equals the time period to be monitored.
Figure 5B:
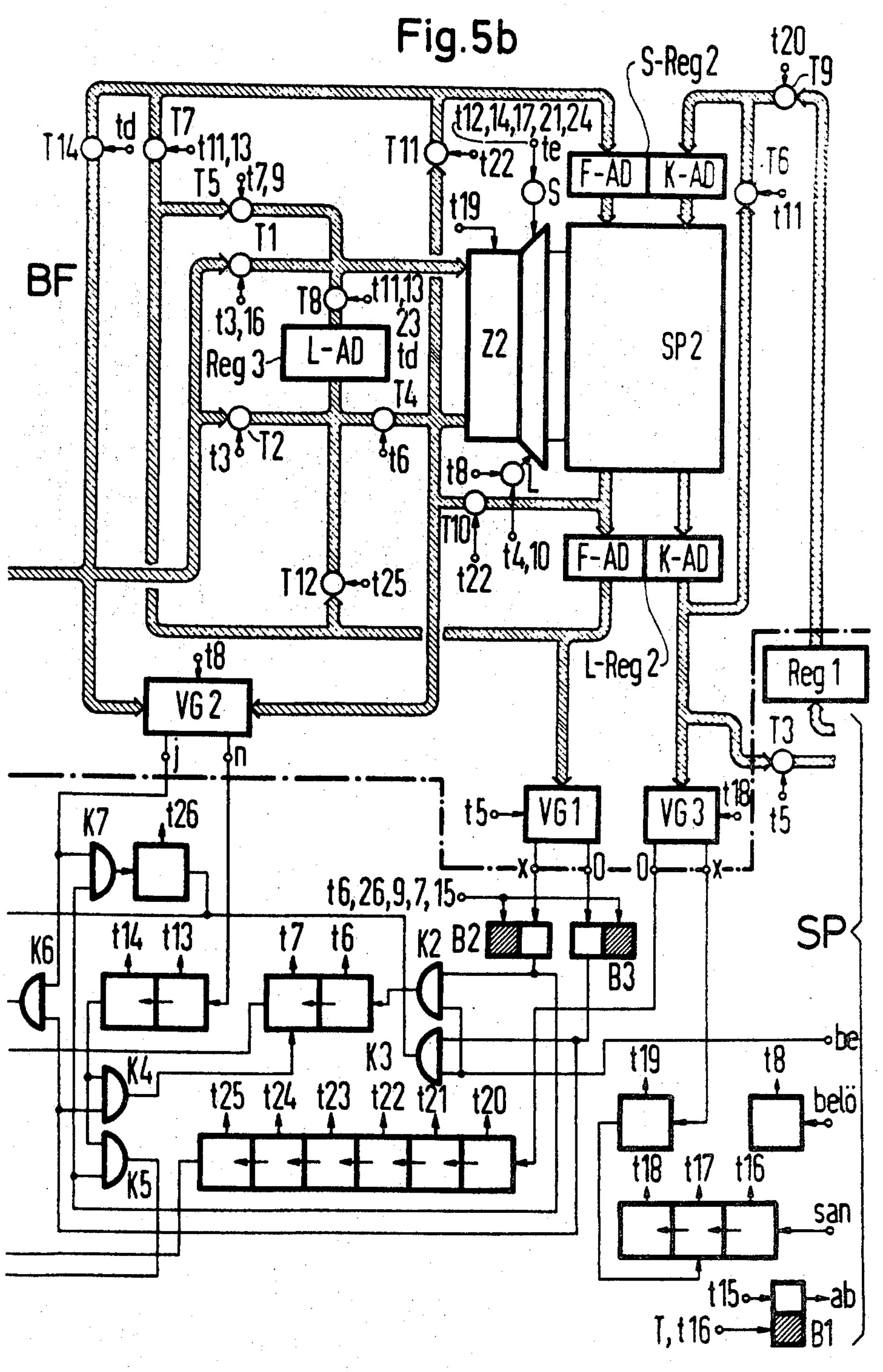

FIG. 5 shows a further working example concerning counting registers for special cases. The essential difference between counting register Z1 provided in the arrangement according to FIG. 5 and that of FIG. 2 is that a plurality of time intervals are not supervised, but rather a single time interval per counting register is supervised and, accordingly, the number of stages in each case is selected to be equal to the quotient of the time interval to be supervised and the most favorable basic period selected with which the counting register is switched forward.

However, aside from that, the command generator according to FIG. 5 has substantially the same structure as that according to FIG. 2. To each stage of counting register Z1 there is also fixedly assigned a storage segment in storage SP1, to which in each case a segment area in storage SP2 corresponds. The arrangement according to FIG. 5 is further different compared to that of FIG. 2 insofar as with the reading of the control commands in storage SP2 and the release thereof for further processing, the read control commands are not simply cancelled in storage SP2, but remain stored until a corresponding cancellation command is present on control line *belo*, so that one and the same control command can be called up several times in succession in equal time intervals. Thus it must not, as in the arrangement according to FIG. 2, be again put in as a new control command after each reading process.

In order to still be able to maintain in simple manner the connection of equal-grade control commands using combination addresses, the principle of connection of grade control commands among each other was also changed as compared to the arrangement according to FIG. 2. As commands can also be cancelled, a rigid succession for the seizing of the individual storage segments within the segment area, fixedly assigned to a counting stage, in storage SP2 cannot be maintained. Therefore, for the connection in each storage segment, an additional subsidiary area is required for the reception of a succession address F-AD which in each case indicates the next storage segment seized by a control command.

On the other hand the partial segments for the last-addresses L-AD could be eliminated in the individual storage segments of storage SP1. Instead only a single control signal in the form of a memory bit MB is provided which indicates whether or not a control command is stored at all in the thereto pertaining counting stage. However this memory bit can equally be omitted if the examination is carried out analogous to the arrangement according to FIG. 2, with comparator VG3. The required operating time necessary is increased, however, as storage SP2 must always be approached first in order to be able to carry out this examination. Moreover, an additional storage register Reg3 is provided for the last-address L-AD in each case to be newly worked up.

Figure 6:
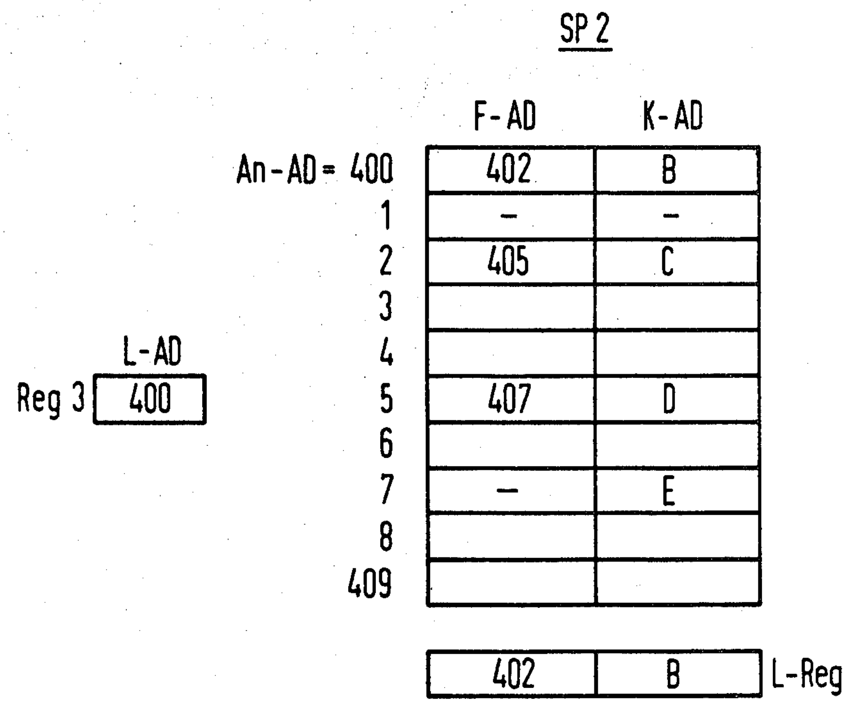
FIG. 6 shows the storage segments for the reception of the code addresses of several control commands to be executed simultaneously.

Before the mode of operation of this arrangement is explained in more detail, first the principle of connection of equal-grade control commands forming the basis of the shown arrangement shall be shown, in conjunction with FIG. 6. FIG. 6 shows a segment area of storage SP2 having storage segments 400–409, which is fixedly assigned to a storage segment of storage SP1, and may be driven therefrom over the address of storage segment 400 in storage SP2 as beginning address An-AD. There are further shown reading register L-Reg of storage SP2 and storage register Reg3 for the last address L-AD in each case.

Deviating from the principle forming the basis of the arrangement according to FIG. 2, the storage segment for a control command which in each case is to be registered newly, is not obtained in the arrangement of FIG. 5 by increasing of the last-address L-AD present in each case by one unit, but, starting with the beginning address An-AD, present in storage SP1 (thus in this case, beginning address 400), the storage segments of the so designated segment area are examined step by step in succession as to whether they are already seized and the control command to be registered newly is in each case registered in the first storage segment which is found free.

There only remains the problem of registering the address of the so newly-seized storage segment as new succession address F-AD at the storage place into which the preceding last control command has been registered with its identification address K-AD. This address is taken out of register Reg3. This is easily possible as new control commands — as in the working example according to FIG. 2 — are taken over only at the beginning of a time interval. That is, immediately after the driving of a counting stage of register Z1 in FIG. 5, all control commands inserted into this time interval have been read and register Reg3 in each case takes over the address of that storage segment which has been read last, but has not been cancelled.

In the given seizing of the shown storage segments 400 to 409, the last control command E is registered in storage segment 407 and not cancelled. Thereby register Reg3 is set automatically on address 407 at the end of the reading process. In the so identified last storage segment there would thus have to be registered as succession address F-AD the address of the storage segment 403, receiving the new storage command, and the setting of register Reg3 would have to be set on the new last-address 403. Thus the storage segments of the shown segment area can now be connected selectively without predetermined succession.

The reading process of each segment area immediately after the approaching of the thereto pertaining counting stage of counting register Z1 in FIG. 5 first proceeds in a manner that, starting with beginning address An-AD of the driven storage segment in storage SP1, the so designated storage segment in storage SP2 (thus in the present case, storage segment 400) is read in the known manner, and the control command A contained in this storage segment is released for further processing. If after the processing of this command the announcement is returned that the command is not to be cancelled, then the address of the last driven storage segment (that is, segment 400) is given to register Reg3. With succession address 401 in storage segment 400, the so designated storage segment 401 is approached as the next one, and the therein stored command B read. If this command too is not to be cancelled, the address of this storage place is now taken into register Reg3 and so on.

However if it appears that, for example, control command B contained in storage segment 401 is to be cancelled, then, with the aid of the last-address L-AD, contained in register Reg3, storage segment 400 is again approached and into the segment for the succession address F-AD, succession address 402, contained in reading register L-Reg, is registered. By reason of this succession address the thereby designated storage segment 402 is then approached and the reading cycle continued.

A special requirement is necessary, however, if a command contained in a storage segment identified by a beginning address An-AD, is to be cancelled, as with the cancellation of the command the beginning address contained in storage SP1 would, without additional measures, lose its character as a control address identifying the beginning of a reading cycle. As a consequence, upon the presence of a cancellation command for a command contained in each case in the first storage segment of a segment area, the next following control command determinable over the succession address is transmitted into this beginning segment and the reading cycle continued with this new command.

The above discussed principle will now be discussed in application to the selected example according to FIG. 6. After reading of storage segment 400 as beginning segment of the shown segment area in storage SP2, the succession address F-AD as well as code address K-AD of the control command are located in reading register L-Reg. Now if the command is to be cancelled, storage segment 401 is approached for the next following control command B with the succession address contained in reading register L-Reg, and this segment is also read. The informations contained thereby in reading register L-Reg are now registered, over the writing register of storage SP2, into beginning segment 400 designated by register Reg3, so that this storage segment now contains succession address 402 and control command B as informations. Subsequently this storage segment is again read and the therein contained control command B is released for processing. If this command were also to be cancelled, the just described control cycle would again be repeated, so that in conclusion the informations found over succession address 402 in storage segment 402 would now be contained in storage segment 400.

During this entire time the setting of register Reg3 is not changed. A change takes place only when a read control command does not have to be cancelled. In this instance the setting contained in Register Reg3 is replaced in each case by the address of the related storage segment, so that register Reg3 in each case identifies that storage segment the contents whereof have been read last, but were not cancelled.

Proceeding from the above explained principle of operation for equal-grade control commands, the mode of operation of the arrangement according to FIG. 5 shall now be described. With each setting of counting register Z1 over blocking gate S1 (which has the same function as that in FIG. 2) by a control pulse of basic synchronization T, synchronizing stage t1 is switched effective simultaneously and thereby the storage segment approached in storage SP1 is read over the reading system, and the beginning address An-AD is transmitted to reading register L-Reg 1. At the same time, the identification contained in the driven memory bit or storage element MB is conducted over reading amplifier LV to coincidence gate K1 and blocking gate S2, and it is examined to determine whether or not a control command is present at all, stored, in storage SP2, for the time interval identified by the setting of counting register Z1.

If no control command to be carried out exists for this time interval, then directly synchronization stage *t*15 is made effective with the control signal appearing at the output of blocking gate S1, over blocking gate S3, the function whereof is to be described later. The becoming effective of this synchronization stage indicates that no further control commands are stored, and as a consequence new control commands can be taken from data storage SP of the central program control means and registered in storage SP2, in that, analogous to the arrangement according to FIG. 2, bistable flip flop stage B1 is set and thereby, over control line *ab*, readiness to receive is marked.

If, however, a control signal appears at the output of coincidence gate K1, synchronization stage chain *t*3 – *t*5 is started. Thus control commands to be carried out exist for the approached time interval, which must now be read out of storage SP2. For this purpose first selection register Z2 of storage SP2 is set with pulse *t*3, over switch T1, with the beginning address An-AD read out of storage SP1. With pulse *t*4 the approached control segment of storage SP2 is read and its information contents transmitted to reading register L-Reg2. Finally with synchronization *t*5 the code address K-AD of the read control command is forwarded over switch T3 for further processing. At the same time examination is made, by means of comparator VG1, whether a succession address F-AD is registered in the read storage segment, indicating that further control commands are present. Depending on the result of this examination either bistable flip flop stage B2 is set over signal outlet *x*.

As soon as the return announcement that the control command transmitted over switch T3 has been carried out and does not have to be cancelled is given over control line be, dependent on the result of the examination, the comparator VG1 activates either synchronization stage *t*6 over coincidence gate K2, or synchronization stage *t*15 directly, identifying the reading process as completed, over coincidence gate K3 and blocking gate S3.

With synchronization stage *t6* becoming effective, the setting of selection register Z2 is stored over switch T4 in register Reg3 as last-address L-AD. Subsequently the last read succession address F-AD is released with pulse *t7* over switch T5 for the setting of selection register Z2 unto the so-identified storage segment of storage SP2, and then the reading and output cycle for storage SP2 is again initiated with the actuation of synchronizing stage *t4*. This action is now repeated until finally synchronization stage *t15* is switched effective over coincidence gate K3, as described above.

However, if after the transmission of a control command from the data storage SP, the return announcement comes, over control line *belo''*, that the last read control command is to be cancelled, synchronization stage *t8* is actuated thereby and the control cycle for the cancellation of this command and the rewriting of the connection addresses initiated. Thereby comparator VG2 first examines whether the setting of selection register Z2 is equal to beginning address An-AD contained in reading register L-Reg1.

If the result of this examination is negative, as the two addresses compared with each other do not agree, synchronization stage *t13* is actuated with the control signal appearing at output *n* of comparator VG2, and, as a consequence, selection register Z2 is set over switch T8 with the last-address L-AD contained in register Reg3, as well as the succession address F-AD contained in reading register L-Reg2 transmitted over switch T7 into the appropriate segment of writing register S-Reg2. With the next following pulse *t14*, the new succession address is registered into the storage segment of storage SP2, the control command whereof had been read previously but not cancelled.

Now the further course of operation depends on whether or not the last read control command which, in the meantime, has been cancelled in storage SP2, is also the last command of the command succession to be read during this time interval. This decision is supplied by comparator VG1, already driven with pulse *ts*, over the subsequently switched bistable flip flop stages B2 or B3. That is, if the succession address of the last read storage segment equalled 0, and as a consequence bistable flip flop stage B3 is set, synchronization stage *t15* is directly started with the switch-forward pulse of synchronization stage *t14* over coincidence gate K5 and blocking gate S3. The operational sequence for the reading of stored control commands is completed thereby, and thus one can reroute to the operational sequence for registering new control commands.

If, however, a succession address was still present in the last read storage segment and as a consequence the bistable flip flop stage B2 is set, the switch-forward pulse of synchronization stage *t14* is forwarded over coincidence gate K4 to synchronizing stage *t7* and thereby the reading cycle initiated again.

If, on the other hand, the address comparison carried out with synchronization *t8* by comparator VG2 is positive because the two addresses agreed, then, dependent on the signaling stage of bistable flip flop stages B2 and B3, either synchronization stage T26 is started up over coincidence gate K7, or the chain circuit consisting of stages *t9* to *t12* is started up over coincidence gate K6.

When synchronization stage *t26* becomes effective, it indicates that the last read and, in the meantime, cancelled control command in storage SP2 was the only stored control command of the present time interval. Signal MB of the approached storage segment, contained in storage SP1, is cancelled therefore and immediately thereafter synchronization stage *t15* started for the initiation of the operational sequence for the registration of new control commands.

However, the actuation of synchronization stage chain t9 to t12 indicates that still further control commands are stored, and however, prior to continuation of the reading cycle, the subsequent control command is to be transmitted to the storage segment identified by the beginning address An-AD, as has already been described with the aid of FIG. 6. For this purpose the succession address F-AD, contained in reading register L-Reg2, is transmitted to the last read storage segment which, in the meantime, was cancelled by pulse *t8*, over switch T5 with pulse *t9* to selection register Z2. The latter (Z2) is set accordingly. The so found storage segment is read with pulse *t10* for the next following control command and the thereby gained informations conveyed with pulse *t11* over switches T6 and T7 to writing register S-Reg2. Moreover, with synchronization *t11*, the beginning address contained in register Reg3 is conveyed as last-address to selection register Z2 over switch T8, so that with the next following pulse *t12* the control command which is intermediately stored in writing register S-Reg2 can be registered in the storage segment identified by beginning address An-AD. This completes the rewriting process and the normal reading cycle for storage SP2 can again be resumed.

However, as the next command to be conveyed-on has already been read prior to the rewriting and is still available in reading register L-Reg2, in this case not synchronization stage *t4*, but synchronization stage *t5* is directly started.

Thus, dependent on the output signals of comparators VG1 and VG2, as well as on the control signals on control lines *be*, or *belo''*, there result within the reading process a series of possible operating successions. The two bistable flip flop stages B2 and B3 are thereby in each case reset to the original position when a final decision has been made with regard to the operational succession to be carried out, for example, with the control synchronizations *t6*, *t7*, *t9*, *t15* and *t26*. The end of the reading process is reached when synchronization stage *t15* is started.

Thus, proceeding from the accomplished setting of counting register Z1 by a control pulse of basic rate T, at first all control commands assigned to this time interval which are stored in storage SP2 are read. Only after the completion of this reading process is the shown command generator ready for reception of new control commands. This second operational segment is initiated, the same as in the arrangement according to FIG. 2, by the marking of the readiness to receive to data storage SP over control line *ab* through flip flop stage B1, set by synchronization stage *t15*.

In case control commands to be newly received are present, the chain circuit comprising synchronization stages *t16* to *t18* is started over control line *san* and at the same time storage Reg 1 is charged with the identification address K-AD of the new command. Further, as in the arrangement according to FIG. 2, blocking gate S1 is blocked over bistable flip flop stage B5.

However, before a new command can be stored in storage SP2, at first a free storage segment must be determined in the segment area defined by the existing time interval, as has already been explained with the aid of FIG. 6. For this purpose, first the beginning address is transferred out of reading register L-Reg 1 to selection register Z2, with pulse *t16*, over switch T1, and thereby the first storage segment of the segment area in question selected.

Subsequently this storage segment is read with pulse *t17*, and with synchronization *t18* the subsidiary segment, destined for the code address, examined with regard to the presence of a command. This examination is carried out with comparator VG3. If the storage segment examined in each case is already seized, which is indicated by a control signal at output *x* of comparator VG3, synchronization stage *t19* is actuated thereby and selection register Z2 set, by a control pulse, on the cyclicly following storage segment in storage SP2. Subsequently synchronization stage *t17* is again actuated, and thereby the newly driven storage segment read and again examined. This action is now repeated until finally a control signal appears at output 0 of comparator VG3, indicating that a not-yet-seized storage segment has been found.

The chain circuit consisting of synchronization stages t20 to t25 then takes over the further program. With pulse *t20*, first the appropriate subsidiary segment of writing register S-Reg2 is charged over switch T9 with code address K-AD, intermediately stored in storage Reg1, for the control command to be newly stored, and with synchronization 21 registered in the storage segment of storage segment of storage SP2 found to be free. The registration of a succession address F-AD in the same storage segment is not necessary as the newly registered control command is in each case the last in the succession of equal-grade control commands.

Subsequently the connection of the newly registered control command with the already stored control commands must be assured. For this purpose the setting of selection register Z2 is transferred at pulse $t22$ over switches T10 or T11, to the areas of reading register L-Reg2 as well as writing register S-Reg2, provided for the succession address F-AD. Subsequently the count appearing on register Reg3 is transferred with synchronization $t23$ over switch T8 to selection register Z2, and thereby that storage segment is selected which is seized by the last command of the present command sequence of the existing time interval. Then, with pulse $t24$, the address which is intermediately stored in writing register S-Reg2 is registered as succession address for the last registered control command in the selected storage segment. The last registered control command is thereby finally connected with the preceding control command in each case.

In order to also assure that in the case of further control commands to be registered the connection with the preceding commands can be carried out in equally simple manner, the address, intermediately stored in the segment for the succession address F-AD of reading register L-Reg2 is also transmitted, with pulse $t25$, over switch T12 to register Reg3. This register thereby contains in each case the address for that storage segment in which the last command, in each case, of a command succession is registered.

At the end of the described operational sequence synchronization stage $t15$ is again actuated, and readiness to receive is again indicated over control line *ab*. This cycle is now repeated, as necessary, until finally with the appearance of the next following control pulse of basic pulse rate T, flip flop stage B1 is reset to rest position for the duration of the reading of the stored command.

In addition to the already described part of command generator BF and central program control means Prog-St, the arrangement according to FIG. 5 shows on the left another supplement for the circumstance where the number of stages of counting register Z1 is to be commutatable, so that, dependent on the effective number of stages, counting register cycles of varying time durations result. Such commutations of the counting register cycle are necessary, for example, if the shown counting register is used for the generation of counting pulses in telephone installations and one must distinguish between a night tariff (NT) and a day tariff (TT) with different sequence time of the individual charge pulses.

Figure 7:
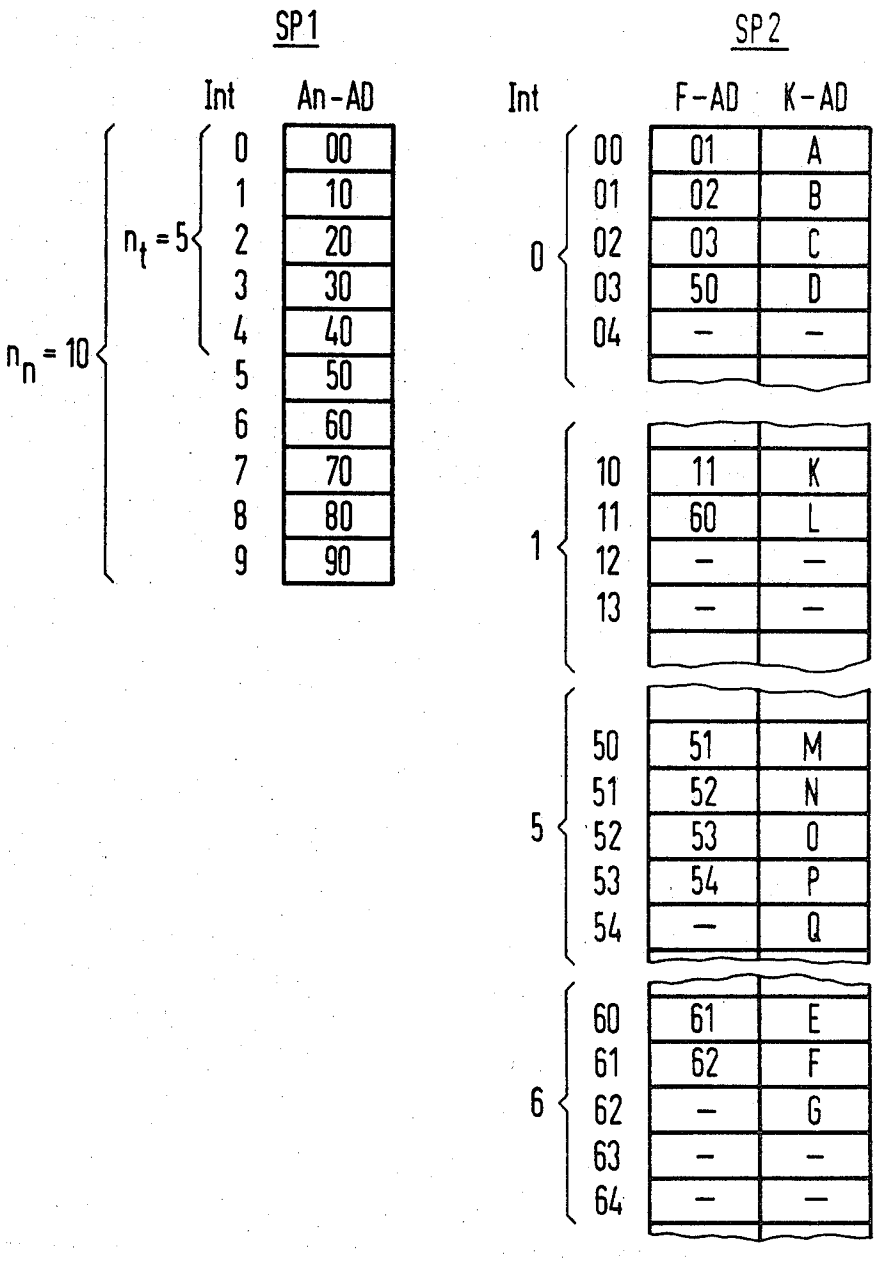
FIG. 7 shows the storage segments utilizing counting registers with a commutatable number of stages per cycle.

The thereby applied control principle shall first be explained in more detail with the aid of FIG. 7. Shown again are the storage segments 0 to 9 of counting register Z1, which in each case contain a beginning address An-AD of segment area assigned to each counting stage in storage SP2. For the sake of simplification there are provided for each counting stage of the counting register 10 storage segments in storage SP2 for the reception of identification addresses K-AD of control commands and, in a given case, necessary succession addresses F-AD.

Moreover, it shall be assumed that, proceeding from a given basic rate T, the counting pulses to be generated for charge determination require, in the case of night tariff (NT) a counting cycle over $n = 10$ counting stages, and in the case of day tariff (TT) a counting cycle over a total of $n_t = 5$ counting stages.

While a commutation of the counting register itself, and thereby the change in the number of stages per cycle, creates no difficulties, there results, however, in a commutation of the counting cycle to a lower number of stages the difficulty of properly including the control commands assigned to the no longer required counting stages into the remaining counting stages. Thus, in the distribution according to FIG. 7, the segment areas of storage SP2, assigned to counting stages 5 and 6, would have to be assigned to the remaining counting stages 0–4 of the counting register. This is now done in a way that after commutation from the long to the abbreviated counting cycle, beginning with the first abbreviated counting cycle, after the processing of the control commands included in each case in the approached counting stage, in cyclic succession one of the no longer needed counting stages is approached and the control commands contained in the thereto pertaining segment area of storage SP2 are connected over their beginning address with the command sequence of the previously driven segment area.

Thus, after the carried-out shortening of the counting cycle, at first counting stage 0 is approached, and then, beginning with beginning address 00 control commands A to D stored in storage SP2 are processed in succession. At the end, for example, storage places 00 03 are assumed to be further seized with one of control commands A to D. Prior to the registration of new control commands the counting register is now set on the first counting stage 5, no longer needed for the abbreviated counting cycle. If there still exist control commands for the counting stage too, in the present case control commands M to Q in storage segments 50 – 54, then the beginning address contained in the approached storage segment of storage SP1, that is 50, is registered as succession address in the storage segment of the previously approached segment area in storage SP2 corresponding to counting stage 0, which is seized by the last command of the there located command succession. In the instant case, thus, in storage segment 03 which is seized by control command D.

This action is now continued until all no longer needed counting stages, that is, counting stages 5 to 9, are examined and the control commands thereof are inserted into the remaining counting stages 0–4. Thus, moreover, control commands E to G, contained in storage segments 60 to 62, are appended, through registration of the beginning address 60 into storage segment 11, to the command sequence of counting stage 1, etc.

This principle can be carried out in the simplest way if the number of counting stages forming the abbreviated counting cycle is larger than or equal to the number of remaining counting stages. However, it can also be carried out if this condition does not exist. In this case the individual counting stages of the abbreviated counting cycle would just have to take over the control commands of two or more counting stages of the rest cycle, instead of one.

According to the previously explained control principle, the partial arrangement shown on the left of FIG. 5 works as follows. As soon as the commutation command for the abbreviation of the operating cycle of counting register Z1 is present at signal input TT, and at output of counting register Z a control signal appears which indicates that counting register Z1 has now reached the first stage of the counting cycle, bistable flip flop stages B6 and B7 are set over coincidence gate K8. Thereby flip flop stage B6 effects over control line u the commutation of counting register Z1. Thus in known manner it prevents that, after reaching the last counting stage of the abbreviated counting cycle, the next following control pulse of basic rate T from acting on the next following counting stage as in the case of the unabbreviated counting cycle. Instead the control pulse is directly rerouted to the first counting stage of counting register Z1. Thereby blocking gate S4 prevents, after the completed commutation of the counting cycle, bistable flip flop stage B7 from again being rendered effective at the beginning of each further counting cycle through bistable flip flop stage B6. This switching stage remains until the transition from day tariff to night tariff again takes place, and flip flop stage B6 is switched into rest position, so that the counting register Z1 again traverses its full cycle from this point on.

However, over flip flop stage B7 the rearrangement of the control commands included in the no longer needed counting stages is initiated, in that blocking gate S3 is blocked so that at first, prior to the actuation of synchronization stage *t*15, at the transition from the reading of stored control commands to the registering of new control commands, the chain circuit consisting of synchronization stages ta to tc is started over coincidence gate K9.

At first count setting of counting register Z1 is ascertained in buffer storage Reg2 with pulse ta over switch T13. Furthermore, with the next following control pulse *tb*, the number $n_t$ of counting stages, forming the shortened counting cycle, are added to the present meter count register Z1, and the counting register Z1 set on the so determined storage segment, which is then read with pulse *tc*. The beginning address An-AD contained in this storage segment thereby arrives in the reading register L-Reg1, and the control signal emanating from the storage element MB identifying the seizure condition is forwarded over reading amplifier LV to coincidence gate K10 and to blocking gate S5.

If no control command is stored for the examined counting stage, the actuation of synchronization stage *t*15, heretofore suppressed by blocking gate S3, occurs directly over the output of blocking gate S5.

If, however, a control command is stored in the examined counting stage, the chain circuit consisting of synchronization stages *td* to *tg* is admitted over coincidence gate K10. With the first operating synchronization *td* of this chain circuit, the last-address L-AD contained in storage Reg3, which identifies the storage segment containing the last command of the just examined command sequence, is transmitted over switch T8 to selection register Z2, and this storage segment is driven. At the same time, the part of the writing register S-Reg2 receiving succession address F-AD is charged over switch T14 with the beginning address An-AD contained in reading register L-Reg1, so that with the next following pulse te the beginning address of the command sequence to be included can be registered as succession address into the storage segment containing the last command of the accepting command sequence.

With synchronization tf the original setting of counting register Z1, intermediately stored in storage Reg2, is again transmitted back over switch T15 and thereby the counting register set on the previously held stage. The next following operating pulse tg assures that seizure signal MB is registered in the original counting stage, should heretofore no control command have been stored. As the current operating sequence is concluded thereby, there also takes place, with the switch-forward synchronization of synchronization stage *tg*, the heretofore suppressed actuation of synchronization stage *t*15 and thereby the rerouting to the writing process.

The just described operating cycle is then as often initiated as is necessary until all counting stages, no longer needed in the abbreviated counting cycle of the counting register Z1, have been seized. The supervision necessary therefor takes place through comparator VG4, which is approached in each case with operating pulse *tb*. If counting register Z1 finally reaches a counting stage, the value whereof equals the difference of the number $n_u$ of the counting stages of the unabbreviated counting cycle, and the number $n_t$ of the abbreviated counting cycle, there appears at output *j* of comparator VG4 a control signal which resets bistable flip flop stage B5 again into rest position, so that blocking gate S3 is opened again.

Figure 8A:
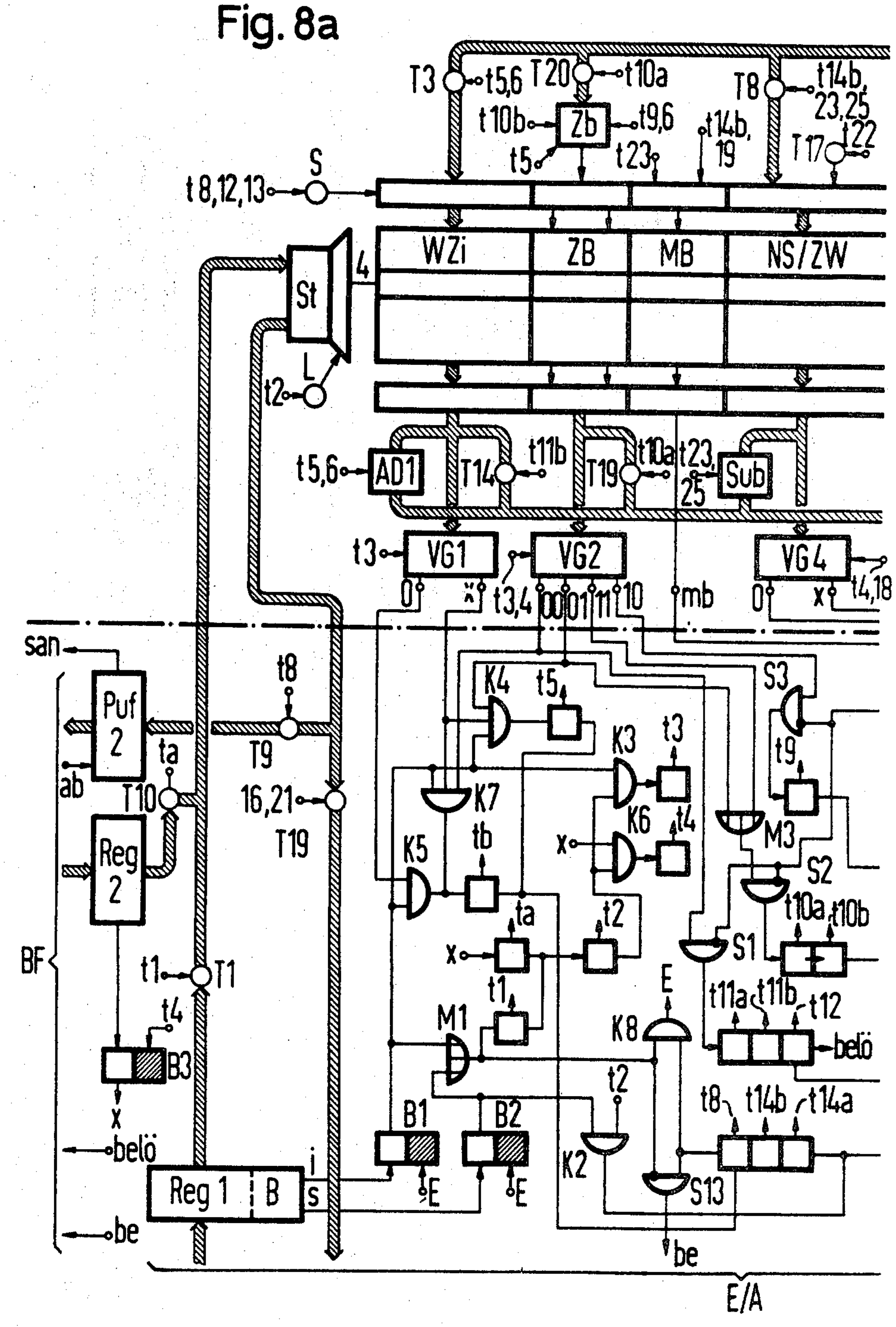
FIGS. 8*a* and 8*b* show a working example of the data storage working together with the command generator according to FIGS. 5*a* and 5*b*.
Figure 8B:
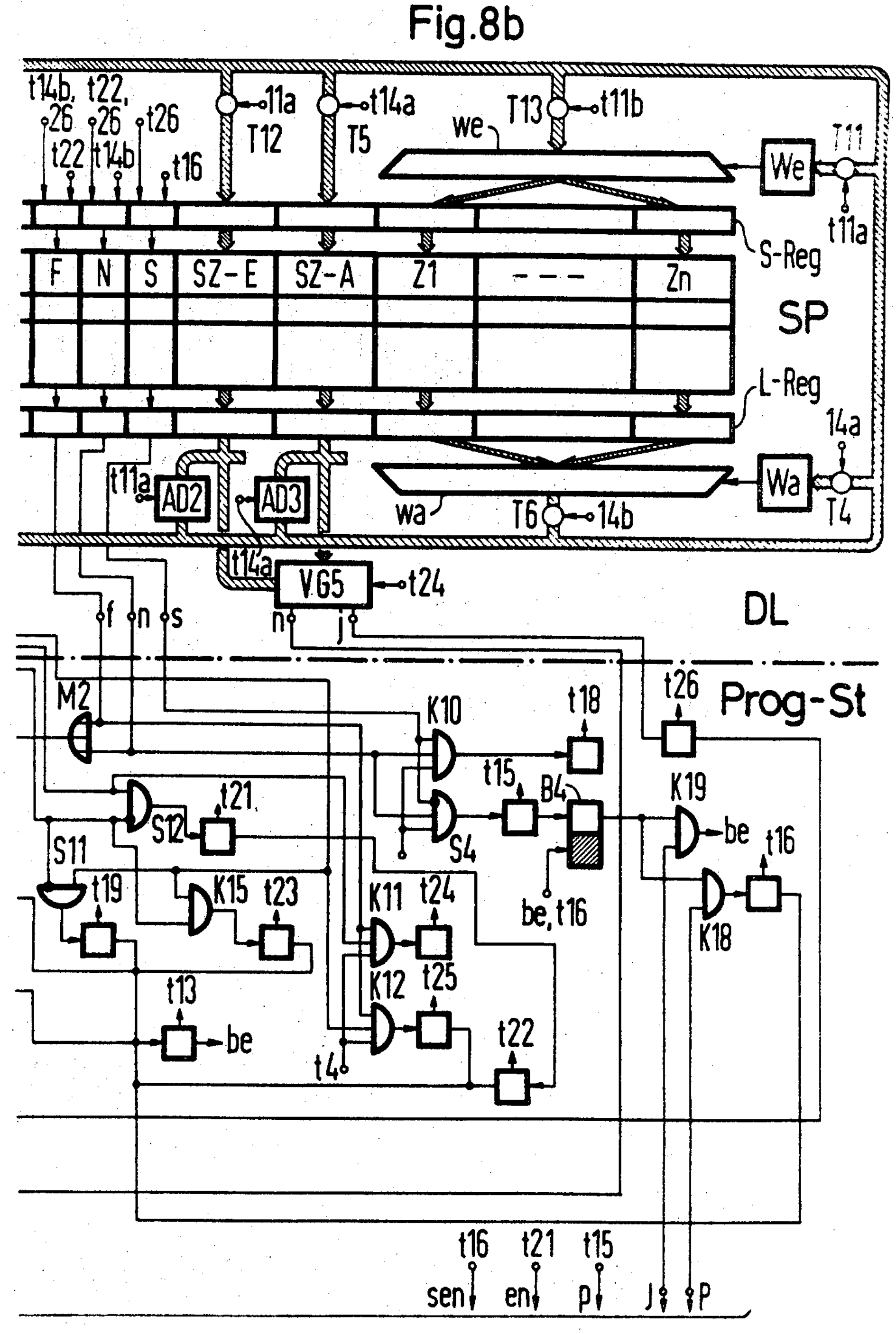
Figure 9A:
FIGS. 9*a* – *g* identify and illustrate the logical functions of the various logic elements used in describing the invention.
Figure 9B:
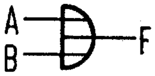
Figure 9C:
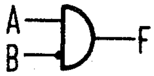
Figure 9D:
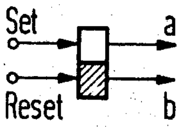
Figure 9E:
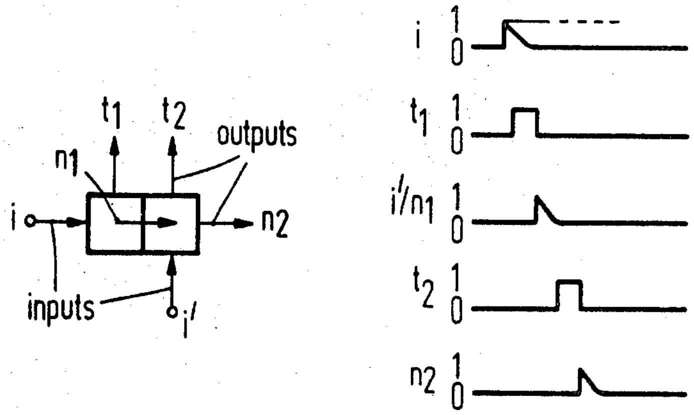
Figure 9F:
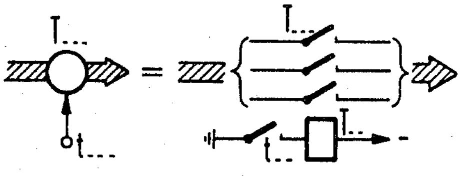
Figure 9G:
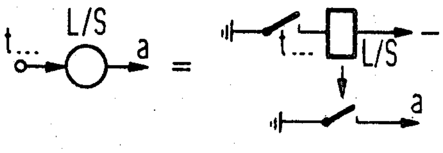

FIG. 8 shows a part of the central command and data storage SP with the relevant part of program control Prog-St which is suited for the cooperation with the command transmitter BF shown in FIG. 5. An example of such cooperation will show how several control functions of a centrally controlled exchange installation can be carried out advantageously with only a single counting register.

For this purpose FIG. 8 shows in its upper part a portion of the central data storage SP with the related reading and writing registers L-Reg and S-Reg, respectively, the control register St for the selection of the storage segments individually assigned to the single peripheral systems of the exchange installation, and common data line DL for the transmission of the data stored in the different partial areas of the individual storage segments to the individual control aggregates.

It shall be assumed in the present case that the peripheral systems of the exchange installation are so-called dial sets which receive the dial digits emitted by a subscriber in the form of current pulse series, and again transmit them as needed. The conversion of the individual current pulse series into the dial digit which is equivalent to the number of current pulses in each case forming a current pulse series, and the conversion of the individual dial digits into a current pulse series possessing an equivalent number of current pulses at the emission of a dial digit takes place with the aid of the data existing in the thereto pertaining storage segment of data storage SP, in conjunction with command generator BF according to FIG. 5 and central program control Prog-St. It is dependent on the commands, communicated over the input - output control E/A by the requesting dial set, that a pulse has arrived or that a digit is to be transmitted. The receipt of such a command takes place through input storage Reg1 which is coupled to a command decoder B.

To each dial set a storage row, for example storage row 4, is individually assigned in data storage SP, which may be driven by selection register ST with the aid of the communicated address. Each of these storage rows is subdivided into several partial areas which individually are of the following importance. Subsidiary area WZi is for the counting-off of pulses of a current pulse series picked up by the thereto pertaining dial set, whereby the end of each current pulse series is monitored dependent on markings contained in partial area ZB. Subsidiary area ZB comprises only two bits in the instant case. The subsidiary area NS/ZW serves in each case for reception of the digit to be emitted again by the dial set, or for reception of an identification number to measure the intermediate dial time between two successive current pulse series, whereby the end of the conversion of a digit to be transmitted subsequently into an equivalent current pulse series is dependent on the marking in subsidiary area MB, which in the present case consists of only one bit.

The further partial areas F, N and S also each comprise only one bit. Subsidiary area F identifies the inclusion of an intermediate dial time, subsidiary area N the subsequent transmission of a digit, and subsidiary area S the synchronization of the control cycle given by command transmitter BF with the central pulse generator for the generation of the current pulse series to be transmitted. The further subsidiary areas SZ-E and SZ-A are used as input and output station counters for the intermediately stored individual dial digits in subsidiary areas Z1 to Zn, which are individually selectable over station selector *we* for input and station selector *wa* for output.

In the following, the general functional program at the reception of dial pulses and at the subsequent transmission of stored dial digits in the form of a current pulse series is explained, dependent on whether a request from the input - output control means E/A or a call up by the command generator BF is present.

1. Dial Impulse Reception

Before the operating sequences necessary for the dial impulse reception are described with the aid of the shown arrangement, the meaning of the markings contained in subsidiary area ZB of command and data storage SP is explained. Assume that counting register Z1 of the arrangement according to FIG. 5 is switched forward by a basic rate T, the control pulses whereof follow each other in intervals of 10 ms., and that the counting register has a total of five counting stages so that the cycle time of the controlling counting register is 50 ms. total. Thus, as in each case after 10 ms. a counting register stage is driven, the data storage is also driven by command generator BF every 10 ms., provided that a control command is stored, in order to initiate an operating sequence dependent on the stored data. One and the same storage segment of data storage SP however, is periodically called up in each case only after 50 ms. have expired, until the thereto pertaining address is again cancelled in the central command transmitter. Thereby the cycle duration of 50 ms. makes possible, referring to the control functions to be carried out, ( that is, the conversion of a current pulse series into equivalent dial digits and the subsequent transmission of stored digits with inclusion of intermediate dial times between the individual current pulse series) an extremely simple controlling at very low expenditure, because the pulse succession time of the current pulse series to be processed amounts generally to 100 ms. at an impulse pause ratio of about 60 to 40 ms.

Now, if with the registration of each new pulse in subsidiary area WZi, both storage elements of partial area ZB are identified by a marking analogous to information 11, then this indicates in the subsequent call-up of the same storage segment by command transmitter BF after 50 ms., that since the registration of the last current pulse no more than 50 ms. have yet expired and therefore that a further current pulse can not yet be expected. This fact is now characterized in that the read information 11 is transformed into information 01. Therefore the reading of this information after another 50 ms. indicates that since the registration of the last current pulse, 100 ms. have now elapsed. If this information 01 is again transformed, that is, into information 00, this finally indicates at the reading after another 50 ms. that a total of 150 ms. have elapsed since the registration of the last current pulse and that thereby the received current pulse series is to be regarded as complete. Thus it can be clearly distinguished with the aid of the three informations 11, 01, and 00 in partial area ZB how much time has expired since the registration of the last current pulse and if the current pulse series can be considered to be completed.

However, the circumstance that the pulse succession time of the current pulse series to be picked up is not always the same, but can fluctuate, causes difficulties. It is therefore easily possible that a new current pulse is to be registered either shortly before a call-up of the thereto pertaining storage segment by the command generator, or shortly thereafter, and that a writing request can find either information 01 or 00, in partial area ZB. If the latter information 00 is present, then, due to the remaining marginal conditions, the call-up by the command transmitter must have occurred shortly prior thereto. Therefore without question information 11 can be registered in partial area ZB, at simultaneous increase by a 1 of the current pulse number contained in partial area WZi, and thereby the new beginning of a 100 ms. cycle can be indicated.

If, however, one would proceed in the same manner upon finding information 01 in subsidiary area ZB, the supervision cycle would be shortened by 50 ms., as, in the directly following call-up of the same storage segment by the command generator, even though the preceding 100 ms. cycle has only just ended, the available information 11 in partial area ZB would already be converted into information 01, as if the first 50 ms. interval had already elapsed. To circumvent these difficulties, upon the existence of a request from input-output control means E/A for the registration of a further current pulse in subsidiary area WZi, and simultaneous existence of information 01 in partial area ZB, information 10 is registered into partial area ZB, which is then, at the immediately following call-up by the command generator, transformed into information 11, and only thereby the new 100 ms. cycle is initiated.

Assuming this, there now result the following functional programs:

1. Request by Input-output Control Means E/A

A control command coming from the dial set reaches, in each case, input storage Reg1 over input-output control means E/A and it is first examined to determine what kind of a request it is. If a dial impulse request exists, flip flop stage B1 is set and thereby synchronizing circuit *t*1 actuated over mixed gate M1. Accordingly the dial set address, intermediately stored in input storage Reg1, is transferred over switch T1 to control register ST of data storage SP and the related storage segment, for example 4, is approached. Subsequently the selected storage segment is read with pulse *t*2 over the thereto pertaining reading system L, and the therein contained information conveyed into reading register L-Reg.

As s current pulse series received from the dial set is to be processed, synchronization stage *t*3 is also switched effective with the switchforward pulse of synchronization stage *t*2 over coincidence gate K3, and with the thereto pertaining operating synchronization, with the aid of comparator V1, examined as to whether it is a new request (that is, the beginning of a new current pulse series) or a further pulse of an already running current pulse series. In the first instance the subsidiary area WZi of the read storage segment would be empty, and in the other instance it would contain any of digits 1 to 9.

a. If the beginning of a new current pulse series exists, synchronization stage *t*6 is actuated over coincidence gate K5 with the control signal appearing at output Zero of comparator VG1, so that by means of the 1-adding means AD1, the digit 1 is registered in the thereto pertaining partial area of writing register S-Reg over common data line DL and switch T3. Moreover, both storage elements of subsidiary area ZB are marked in the writing register over control switching link Zb, which is developed as two-stage counting switching link. Thereby all necessary information changes have now been prepared. The registration of the previously made available new informations takes place after the approaching of synchronization stage *t*8 through writing system S of the data storage. Furthermore, the address of the thereto pertaining dial set is transferred with the same operating synchronization over switch T9 to buffer storage Puf2, and thereby a request is marked for the central command transmitter which then takes over the new command, as has already been described with the aid of FIG. 5. The operating sequence released by the request over the input-output control means E/A is terminated thereby, which is indicated by the final marking E taking place over coincidence gate K8 through the switch-forward pulse of synchronization stage *t*8.

b. If, however, signal output *x* of comparator VG1 carries a control signal at the examination of storage area WZi with operating pulse *t*3, the further operating succession depends on which marking is contained in the partial area ZB of the read storage segment, which is also examined with synchronization *t*3 through comparator VG2.

If outlet 00 of comparator VG2 supplies a control signal, as the subsidiary area ZB contains information 00, synchronization stage *t*16 is also actuated over coincidence gate K7. The read storage segment must have just been called up prior to that by the command generator. In addition, and at a minimum of 100 ms. since the registration of the last current pulse in the partial area, a 1 is to be added again and in partial area ZB the information 11 is to be registered for the identification of the beginning of a new 100 ms. cycle.

If, however, outlet 01 of comparator VG2 supplies a control signal, as partial area ZB contains information 01, synchronization stage *t*5 is actuated over coincidence gate K4. In this instance the last 100 ms. cycle is not yet completed; however, it should end soon. As a consequence, the current pulse number of the read partial area WZi, increased by 1, is transmitted into writing register S-Reg2, with pulse *t*5 over adding means AD1 and switch T3, and information 10 registered in partial area ZB of the writing register over counting connecting link Zb. Subsequently the informations made available in this manner are again registered with pulse t8 and the final marking E is released over coincidence gate K8.

2. Call-up by the Command Generator

As has already been explained in detail with the aid of the arrangement according to FIG. 5, with the driving of each counting stage in counting register Z1 thereof, the control commands stored in storage SP2 transferred to the program control part for the central data storage, where they are received successively in input register Reg2. At the acceptance of the code address of each control command called up by the command transmitter, bistable flip flop stage B3 is set at the same time, which thereupon switches synchronization stage *ta* effective. At first the existing code address is transferred with the thereto pertaining operating synchronization over switch T10 to control register ST, and the corresponding storage segment of data storage SP is approached. Subsequently synchronization stage t2 is actuated and thereby the informations contained in the selected storage segment transferred over reading system L to reading register L-Reg. With the subsequent operating synchronization of synchronization stage t4, actuated subsequently over coincidence gate K6, it is first examined with the aid of the read informations which controlling state exists at all, with regard to the thereto pertaining dial set, at the time of the call-up by the central command transmitter. This examination is made in view of the possible conversion of a current pulse series into the equivalent dial digit with the aid of comparator VG2.

In this instance three different operating sequences are possible:

a. If one of the two outputs 11 and 01 of comparator VG2 supplies a control signal, the chain circuit consisting of synchronization stages *t*10a and *t*10b is started over mixed gate M3 and blocking gate S2. Since the registration of the last current pulse in subsidiary area WZi, at least 50 ms. but no more than 100 ms. have elapsed. Accordingly the marking in subsidiary area ZB is to be decreased by one unit to indicate the time of a further 50 ms. which has elapsed since last being driven. Therefore the read marking is transmitted with operating synchronization *t*10a over switches T19 and T20 as well as the common data line DL for presetting to counting connecting link Zb, and with the next following operation pulse the marking, decreased by one unit, is transmitted to partial area ZB of writing register S-Reg. Subsequently the so changed information is transmitted with the operating synchronization of synchronization stage *t*13 into the selected storage segment of data storage SP. This operating succession is completed thereby, and the communication to central command transmitter BF that the control command previously communicated by it has been processed takes place over control line be with the switch-forward pulse of synchronization stage *t*13.

b. If during examination of subsidiary area ZB it is found by comparator VG2 with pulse *t*4 that both marking signals are already cancelled, and as a consequence synchronization stage *t*11a started over blocking gate S1, this indicates that since the last arrival of a current pulse at least 150 ms. have expired. The picked-up current pulse series is completed thereby and the dial digit contained in partial area WZi is complete. Therefore the meter setting Z-E for the setting of station selector *we* is increased by 1 with operating pulse *t*11a by the 1-adding means AD2, and the thereby obtained new station value transmitted over switch T11 to setting register We, and station selector we set on the thereby identified partial area for the individual digits Z1 to Zn. If the first digit of a dial succession is concerned, station selector SZ-E had a zero value, so that due to the 1-addition the station selector *we* is set on the partial area for the first digit Z1. At the same time the new station value is transmitted over switch T12 into partial area SZ-E of writing register S-Reg. Then the digit contained in partial area WZi is transmitted, with the subsequent operating synchronization *t*11t over switches T14 and T13 to the selected subsidiary area, for example Z1, of the writing register, and area WZi is cancelled. The informations made available in this manner are finally registered with operating pulse *t*12 in the selected storage segment, and this operating succession is thereby completed, so that with the switch-forward pulse of synchronization stage *t*12 it can be communicated to command generator BF over control line *belo''* that the previously communicated control command has been processed and can now be cancelled in the command generator.

c. If, finally, output 10 of comparator VG2 carries a control signal at examination with operating pulse t4, synchronization stage *t*9 is actuated over blocking gate S3. Directly prior to the call up by the command generator a dial pulse has already been registered. Thus only the beginning of a new 100 ms. cycle is to be marked. Accordingly, both marking signals are set with synchronization *t*9 over counting connecting link Zb, in partial area ZB of writing register S-Reg, and subsequently transmitted with pulse *t*13 to the driven storage segment, and completion of the command is communicated over control line be to command transmitter BF.

In all three above explained operating sequences blocking gates S1, S2 and S3 prevent that, at the existence of a subsequent transmission command or at the running of the intermediate dial time which can be recognized by the markings in partial areas N or F, initiation of the previously mentioned operating successions.

II. Subsequent Transmission of Digits

It shall further be assumed that not a current pulse series received by the dial set is to be converted into an equivalent dial digit, but vice versa, a dial digit already stored in the data storage is to be converted into an equivalent current pulse series and is to be transmitted by the dial set.

1. Request by the Output Control E/A:

If instead of request for dial pulse reception, a subsequent transmission request is present, bistable flip flop stage B2 is set over control line *s* of command decoder B. As in the setting of flip flop stage B1, first pulse *t*1 and *t*2 are actuated thereby in succession and the informations of the thereto pertaining storage segment read. However, at the same time, the chain circuit consisting of synchronization stages *t*14a, *t*14b and *t*8, is started with operating synchronization *t*2 over coincidence gate K2. Thereupon the setting of output station counter Sz-A is increased by a 1 with pulse *t*14a through 1-adding means AD3, and transmitted over data line DL and switch T4 to setting register Wa of output station selector *wa*, as well as over switch T5 in the thereto pertaining area of writing register S-Reg, so that at the end of this operating synchronization the output station selector wa is set on the subsidiary area for the first dial digit Z1. With the next following operating synchronization *t*14b, the selected digit Z1 is transmitted over switch T6 and switch T8 into the subsidiary area NS/ZW of writing register S-Reg. Moreover, with the same synchronization a marking is set in partial area MB and in partial area N of the writing register and a possible marking in partial area F cancelled, so that with the next following operating pulse *t*8 the available and changed information can be registered into the selected storage segment.

This also completes this operating succession released by input-output control means E/A and, as in the operating succession regarding the dial impulse request, end marking E occurs at the output of coincidence gate K8.

2. Call Up by Command Transmitter:

Whether a stored dial digit is to be transmitted again in the form of a current pulse series is recognized by the marking in the storage element of subsidiary area N, the corresponding partial area whereof in reading register L-Reg supplies a control signal over control line *n* which starts over control gates K10 or S4 either synchronization stage *t*18 or synchronization stage *t*15. Which of the two synchronization stages is started depends further on the simultaneously read marking in subsidiary area S. This marking indicates whether or not the momentary approach cycle of the determining storage segment in data storage SP is already synchronized with the (not shown) central (pulse) generator supplying the current pulse to be series transmitted.

a. It shall first be assumed that the subsequent-transmission command has just been stored and no synchronization exists as yet with the central pulse generator. Therefore during the examination with operating synchronization *t*4 over blocking gate S4, synchronization stage *t*15 is actuated and it is examined with the operating synchronization thereof — control line *p* — whether a pause or a pulse has just been transmitted by the central pulse generator. During this examination, there is further set with the switch-forward pulse of synchronization stage *t*15 the bistable flip flop stage B4 and thereby coincidence gates K11 and K19 prepared for evaluation of the return announcement from the central pulse generator. In case of return announcement over control line J, signifying that a pulse has just been transmitted, the started operating succession is immediately terminated over coincidence gate K19 and the called-up control command announced to be completed over control line *be* to command transmitter BF, as the transmission can only be initiated with the next call-up. If, however, an announcement is returned over control line P that a pause has just been transmitted, synchronization stage *t*16 is actuated over coincidence gate K11. With the thereto pertaining operating pulse the command — control line *sen* — is given, under simultaneous release of the thereto pertaining dial set address, over switch T19 to the inlet-output control means E/A, to switch, in the thereto pertaining dial set, the central pulse generator to the departing line, so that the control pulses supplied by it are thereby transmitted. At the same time the synchronization marking is carried out in subsidiary area S of writing register S-Reg, which is then registered in further succession with operating synchronization *t*13 in the selected storage segment. Subsequently, as had already been described, the announcement of completion is again made to the command transmitter over control line *be*.

b. If, however, both subsidiary areas N and S of the read storage segment contain a marking, then synchronization stage *t*18 is switched effective in the examination by operating synchronization *t*14 over coincidence gate K10. The becoming effective of this synchronization stage necessitates a further examination in order to be able to decide which of the three further possibilities of operating successions is to be initiated now, which is dependent on the information in partial area MB that is for the time supervision, and on the information in partial area NS/ZW of the approached storage segment. It must thereby be remembered that upon the registration of a subsequent-transmission command the storage element forming partial area MB has been marked at the same time. If this marking is still present at the examination by operating synchronization *t*18, this signifies that since the setting of the synchronization signal in partial area S only 50 ms. have expired. Thus one can not yet expect that the first control pulse of the current pulse series to be transmitted has already been transmitted, but that the transmission thereof will have taken place with certainty only after the expiration of a further 50 ms. This second 50 ms. time interval is identified in each case by the cancellation of the marking in partial area MB. In order to further be able to check as to when the number of control pulses, corresponding to the dial digit to be subsequently transmitted, has been transmitted, the subsequent transmission digit contained in partial area NS/ZW is decreased by 1 simultaneously with each cancellation of the marking in subsidiary area MB, until the zero value has been reached. The examination processes resulting therefrom are carried out with the aid of comparator VG4 as well as with control gates S11, S12 and K15.

b. 1. If the marking is still present in partial area MB, then the control signal emitted by the corresponding partial area of reading register L-Reg acts directly on synchronization stage *t*23 upon the becoming effective of the operating pulse *t*18, upon coincidence gate K15. This (*t*23) has the effect that the marking contained in partial area MB of writing register S-Reg is cancelled and that, in conjunction with the 1-subtraction means Sub and switch T8, the digit read out of partial area NS/ZW is again available, decreased by 1, for the next following writing process. This writing process is again released with pulse *t*13 and subsequently the command processing marked over control conductor *be*.

b. 2. If, however, no control signal is present on control line *mb* during the examination by operating synchronization *t*18, as no marking is present in the read partial area MB, and if, at the same time, output *x* of comparator VG4 carries a control signal, as the supervision digit contained in partial area NS/ZW has not yet reached the value zero, synchronization stage *t*19 is actuated over blocking gate S11. This has the effect that in writing register S-Reg the time-marking for the partial area MB is set again, which is then transmitted with the next following operating synchronization *t*13 into the selected storage setment. The new registration of this time-marking is synonymous with the beginning of a further 100 ms. time interval, which is required for the emission of a control pulse of a current pulse series by the central pulse generator, and whereby the marking identifies the first 50 ms. and the cancellation of the marking the second 50 ms. of this time interval.

b. 3. If the examination of the supervision digit contained in subsidiary area NS/ZW by comparator VG4 with operating pulse *t*18 reveals that the supervision digit equals 0, then synchronization stage *t*21 is switched effective over blocking gate S12 with the control signal appearing at outlet 0 of comparator VG4, in the absence of the time marking in partial area MB. The actuation of this synchronization stage signifies that a current pulse series corresponding to the dial digit to be transmitted subsequently has already been transmitted. The further transmission of control pulses by the central impulse generator must therefore be terminated. Operating pulse *t*21 announces this under simultaneous release of the address of the thereto pertaining dial set over switch T19 to the input-output control E-AD — control lines —, which conveys this command on.

Subsequently synchronization stage *t*22 is actuated with the switch-forward pulse of synchronization stage *t*21. This causes that, prior to the subsequent-transmission of the next digit a time interval of for example 500 ms. passes, in order that successive current pulse series can be kept apart with certainty by the intermediate dial time existing therebetween. The elapsing of this intermediate dial time is also supervised with the aid of partial area NS/ZW through counting-off of a corresponding number of control cycles. For this purpose the partial area NS/ZW of writing register S-Reg is charged with operating pulse *t*22 over switch T17 with identification digit 10, and moreover a marking, identifying the running of the intermediate dial time is set in partial area F, and the marking in partial area N of the writing register is cancelled. Subsequently both informations are registered in the selected storage segment with operating synchronization *t*13, so that thereby this operating succession is also completed and the disposition marking can take place over control line *be*.

c. With each further call-up of this storage segment by the central command generator BF, due to the identification in partial area F, either synchronization stage *t*25 is actuated over coincidence gate K12, or synchronization stage *t*24 over coincidence gate K11, during the supervision with operating pulse t4. Which of these two synchronization stages is actuated depends on whether or not the identification digit contained in the read subsidiary area NS/ZW has reached value zero. This is checked with comparator VG4.

c. 1. If a control signal appears at outlet *x* of comparator VG4, as the read identification digit does not yet equal 0, then, over coincidence gate K12, synchronization stage *t*25 responds, which, in conjunction with the 1-subtraction means Sub and switch T8, effects the decrease of the read identification digit by one unit, and the transmission of this result into the corresponding partial area of writing register S-Reg. Synchronization stage *t*13 becoming effective subsequently thereupon again releases the writing process for the changed information and approaches the command generator over control line *be*.

c. 2. If the identification digit contained in subsidiary area NS/ZW has reached the value zero, there appears during the examination by comparator VG4 with operating pulse *t*4, a control signal at outlet 0, which actuates synchronization stage *t*24 over coincidence gate K11. First it is examined by comparator VG5, with the operating pulse of synchronization stage *t*24 whether still a further digit is present in partial area Z1 – Zn for subsequent transmission. For this purpose simply the readings SZ-E and SZ-A for the input and output station selectors are compared:

If no further digits to be subsequently transmitted are present any longer, then synchronization stages *t*26 and *t*12 tion of frequently occurring time-dependent functional sequences, the number of stages whereof equals in each case, the quotient of the given time interval and the most favorable basic counting time selected.

6. A central command generator as recited in claim 5 further comprising:

means assigned to the counting register (for ex. Z1) for varying the number of stages (for example $n_u$) of the counting register cycle such that in the case of an abbreviation of the counting register cycle, to the storage segments assigned to the no longer needed stages (for example $n_{t+1}$ to $n_u$) of the counting register are assigned, stage by stage, to the storage segments of the remaining stages (0 to $n_t$).

7. A central command transmitter as recited in claim 6 wherein the storage segments assigned to the individual stages (for ex. 1 to 5) of a counting register (for ex. Z1) for the code addresses (K-AD), or the thereby identified storage segments, have in each case an additional subsidiary segment used as counting means (for ex. ZB and MB) so that time intervals corresponding to the multiple of the counting cycle can be monitored.

8. A central command generator as recited in claim 7 wherein the storage segments assigned to the individual stages (for ex. 1 to 5) of a counting register (for ex. W), for the code addresses (K-AD), or the thereby identified storage segments, in each case have a subsidiary segment (for ex. N and F) used for special signals, so that the same storage segment (for ex. NS/ZW) can repeatedly be used for different control functions.

* * * * * are made effective successively by the control signal appearing at outlet *j* of comparator VG5. Thereby the marking contained in partial areas F, N and S is cancelled and, over control line *belo''*, communication to the command transmitter that the previously called-up control command has been carried out and is to be cancelled now is made.

If, however, the two readings examined by comparator VG5 with pulse *t*24 are not equal, as still further digits to be subsequently transmitted are stored, synchronization stage *t*14a is actuated by the control signal appearing at output *n* of comparator VG5.

Thereby the same operating succession is initiated as has been described in the beginning in the case of the reception of subsequent transmission command over the input and output control means E/A. The only difference is that now no general end marking E is given with the switch-forward pulse of synchronization stage *t*8, over coincidence gate K8, but that over blocking gate S13 a disposition marking is given to control line *be* for central command generator BF.

As is evident from the above explained mode of operation according to FIG. 8, in conjunction with the command generator according to FIG. 5, various problems can be solved in simple manner within an exchange installation with a single counting register of the command transmitter at appropriate synchronication of the counting register cycle to the individual time conditions to be fulfilled, due to the fact that through additional subsidiary segments utilized as counting means such as for example, partial segment ZB for dial impulse integration, partial area MB for the subsequent transmission of digits, and partial area NS/ZW for the supervision of the intermediate dial time, given multiples of the counting register cycle are supervised. Further, different subsidiary areas can be used, through additional control signals as for example the control signals in partial areas F and N in simple manner for various tasks, so that the total requirement of storage volume decreases. The arrangement according to FIG. 8 thereby represents only an example which can be modified for the same tasks in one way or another without great difficulties. Thus, for example, the same tasks can also be carried out if, for example, subsidiary areas WZi, ZB, MB, NS/ZW, F, N and S were provided instead of in data storage SP, in storage SP2 of the command generator BF instead of the subsidiary areas necessary for the code addresses K-AD. Thereby for each dial set a storage row would have to be utilized in storage SP2 which is approachable directly over the dial set address by selection register Z2. A constant beginning address An-AD in storage SP1 per counting stage of counting register Z1 could be eliminated and, instead in each case, the address of the dial set would have to be stored at the place which has been included as the first one in a counting stage. As the presence of an address in storage SP1 would directly indicate whether a control command is stored at all for a counting stage in question, the additional control signal MB could also be eliminated.

Moreover, the switching aggregates used in all working examples could be developed in any manner known per se. This is in particular true for the registers exercising a counting function, which can be realized in the form of chain circuits of separate components, as well as through storage segments working together with an addition circuit; for example, analogous to subsidiary area WZi in FIG. 8 in conjunction with an adding means. The used synchronization stages *t* . . . can be developed of flip flop stages in a manner known per se, which are combined, as needed, into chain circuits. In the same way, instead of the operating sequences carried out with separate switching elements, arrangements can also be realized wherein the individual operating successions are controlled by partial programs, consisting of individual control commands, which are stored in a program storage.

FIGS. 9*a* – *g* illustrate the various symbols used for the logic elements utilized in the circuitry described hereinabove, and the associated truth tables, wave forms and switch closures describe the functions of these elements. In view of the fact that known symbols are used, and the interpretation of truth tables, wave forms and switch closures is a known art, no further discussion of these figures will be given herein. It should be pointed out, however, that it is contemplated that conventional circuitry will be used in constructing these logic elements.

We claim:

1. A telecommunications exchange installation in which program controlled functional sequences are produced by a common generator comprising a pulse generator and at least one counter having a plurality of stages driven by said pulse generator, comprising:

individual storage means (SP1) assigned to each individual stage of said counter and means for storing code addresses of control commands, which arrive at arbitrary times and which initiate control functions when said code addresses are accessed, after the elapse of a predetermined time interval, in the one of said storage means assigned to that counter stage which follows the stage reached by said counter register at the arbitrary time of arrival of a control command by a number of stages equal to the quotient of said predetermined time interval and the basic period of said counter register.

2. The central command generator for a telecommunication exchange installation as defined in claim 1 wherein:

a plurality of counting registers (EZH) are combined into a chain of counters wherein each subsequent counting register is advanced by a pulse received from the preceding counting register, said storage means (SP) assigned to the individual stages of individual counting registers having a subsidiary segment for said code addresses (K-AD) of the individual control commands, and further subsidiary segments (*a*-*b*), the number of which corresponds to the total number of the preceding counting registers, and further comprising:

means for counting a given time interval by adding to it the phase time of said central command generator, as determined by the setting of all counting registers, the phase time value, so obtained, being divided, starting with the largest basic counter rate, into whole number multiples of the individual counting register basic rates, means for registering the code address of the related control command (X) in a storage segment of the counting register (H) identified by the largest required basic rate which is assigned to that stage of the counting register identified by the multiple of the associated basic rate, and means for registering in the free partial segments of the so-determined storage segment, the multiples of the remaining basic rates as addresses for stages of the related counting registers which successively receive the code address of the control command together with the remaining multiple in each case.

3. The central command generator for a telecommunication exchange installation as defined in claim 1 wherein a plurality of control commands are to be initiated substantially simultaneously, further comprising:

further storage means (SPZ) and means for storing said plurality of commands at addresses in said further storage and a key address for the latter addresses in the storage means assigned to a stage of said counter register.

4. A central command generator as recited in claim 1 wherein the counting registers comprise a storage segment, the information contents whereof, in a recurrent cyclic manner and controlled by a basic rate are periodically increased or decreased by one unit until a predetermined value has been reached, such that the information content in each case designates that registration stage, the storage unit whereof is to be examined.

5. A central command generator as recited in claim 1 further comprising separate counting registers for the initia-